US012659570B2

(12) United States Patent
Kumar Agrawal et al.

(10) Patent No.: US 12,659,570 B2
(45) Date of Patent: Jun. 16, 2026

(54) METHODS AND ELECTRONIC DEVICES ADJUSTING OUTPUT OF A VIDEO RECORDING MODE OF OPERATION AS A FUNCTION OF DEVICE GEOMETRY AND SUPPORT CONDITION

(71) Applicant: Motorola Mobility LLC, Chicago, IL (US)

(72) Inventors: Amit Kumar Agrawal, Bangalore (IN); Bill Ryan, Libertyville, IL (US); Daniel M Vacura, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 47 days.

(21) Appl. No.: 18/680,108

(22) Filed: May 31, 2024

(65) Prior Publication Data

US 2025/0373932 A1 Dec. 4, 2025

(51) Int. Cl.
*H04N 23/63* (2023.01)
*G06F 3/0346* (2013.01)
(Continued)

(52) U.S. Cl.
CPC ......... *H04N 23/632* (2023.01); *G06F 3/0346* (2013.01); *H04M 1/0214* (2013.01);
(Continued)

(58) Field of Classification Search
CPC .... H04N 23/632; H04N 23/62; H04N 23/667; H04N 23/631; G06F 3/0346;
(Continued)

(56) References Cited

U.S. PATENT DOCUMENTS 6,281,872 B1 * 8/2001 Cariffe ................ G06F 3/04845
345/658
11,698,297 B2 * 7/2023 Chen ..................... G01J 1/4204
250/239
(Continued)

OTHER PUBLICATIONS

"Nubia Watch", Flexible wristwatch; Unknown exact availability date but believed to be prior to filing of present application; Available online at https://www.nubiamart.com/nubia-watch.html? srsltid=AfmBOopV9m6natcLzCC8Q19r_ 8GSen9YwaVePoUZntvX44gQTAoCR-JA.
(Continued)

*Primary Examiner* — Kelly L Jerabek
(74) *Attorney, Agent, or Firm* — Philip H. Burrus, IV

(57) ABSTRACT

An electronic device includes a deformable housing with linkage members, a flexible display, and an image capture device. The device features sensors to determine a wrapped, wrist-worn geometric configuration and to detect orientation relative to gravity. Processors, in conjunction with the sensors and image capture device, adjust the video capture output orientation to compensate for deviations from gravity's direction. This adjustment ensures an upright video capture experience, even when the device is worn on the wrist. The processors may also present the adjusted video output on the flexible display with indicators of the rotation applied. The device can dynamically adapt to various form factors, enhancing the video recording experience by maintaining a consistent horizon in the output, regardless of the device's orientation during use.

20 Claims, 7 Drawing Sheets

(51) Int. Cl.
    *H04M 1/02*           (2006.01)
    *H04N 23/62*         (2023.01)
    *H04N 23/667*       (2023.01)

(52) U.S. Cl.
    CPC .......... *H04M 1/0268* (2013.01); *H04N 23/62*
            (2023.01); *H04N 23/667* (2023.01)

(58) Field of Classification Search
    CPC ............. H04M 1/0214; H04M 1/0268; H04M
            1/0269; H04M 1/0206; H04M 1/0202;
                                   H04M 1/02
    See application file for complete search history.

(56) References Cited

U.S. PATENT DOCUMENTS

| | | | |
|---|---|---|---|
| 2005/0276164 A1 | 12/2005 | Amron | |
| 2010/0117975 A1* | 5/2010 | Cho ...................... | G06F 1/1652 |
| | | | 345/173 |
| 2013/0235008 A1* | 9/2013 | Kwon ................... | G09G 3/035 |
| | | | 345/204 |
| 2015/0036944 A1* | 2/2015 | Restrepo ................... | G06T 5/20 |
| | | | 382/296 |
| 2018/0018753 A1* | 1/2018 | McLaughlin ......... | G06F 1/1626 |
| 2018/0152630 A1* | 5/2018 | Demoulin ............ | G06F 1/1694 |
| 2021/0195118 A1* | 6/2021 | Mustapha ........... | H04N 5/2628 |
| 2022/0103670 A1* | 3/2022 | Liao .................... | H04M 1/0216 |
| 2022/0201224 A1* | 6/2022 | Siu ....................... | H04N 23/631 |
| 2023/0162332 A1* | 5/2023 | Yang ...................... | G06T 17/00 |
| | | | 348/241 |
| 2025/0258520 A1* | 8/2025 | NakaMats ......... | H04M 1/72409 |

OTHER PUBLICATIONS

"The Most Futuristic Flexible Display Phone", YouTube; Unbox Therapy Channel; Nubia Alpha Watch; Premiered Mar. 29, 2029; available at https://www.youtube.com/watch?v=JbY8DM8c-h0&t=292s.

Mertens,, "Both Samsung and LG unveil new smartwatches with flexible (plastic-based) AMOLEDs", OLED-info; Aug. 28, 2024; available online at https://www.oled-info.com/both-samsung-and-lg-unveil-new-smartwatches-flexible-plastic-based-amoleds.

\* cited by examiner

METHODS AND ELECTRONIC DEVICES ADJUSTING OUTPUT OF A VIDEO RECORDING MODE OF OPERATION AS A FUNCTION OF DEVICE GEOMETRY AND SUPPORT CONDITION

BACKGROUND

Technical Field

This disclosure relates generally to electronic devices, and more particularly to deformable electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in geometric configuration, has a rigid form factor, and has a display disposed along a major face of the electronic device. By contrast, a "clamshell" device has a mechanical hinge that allows one housing to pivot relative to the other.

Some consumers prefer fixed geometric configuration devices such as candy bar devices. However, many others prefer deformable electronic devices such as clamshell devices. It would be advantageous to have an improved electronic device can operate in both deformed and non-deformed states.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
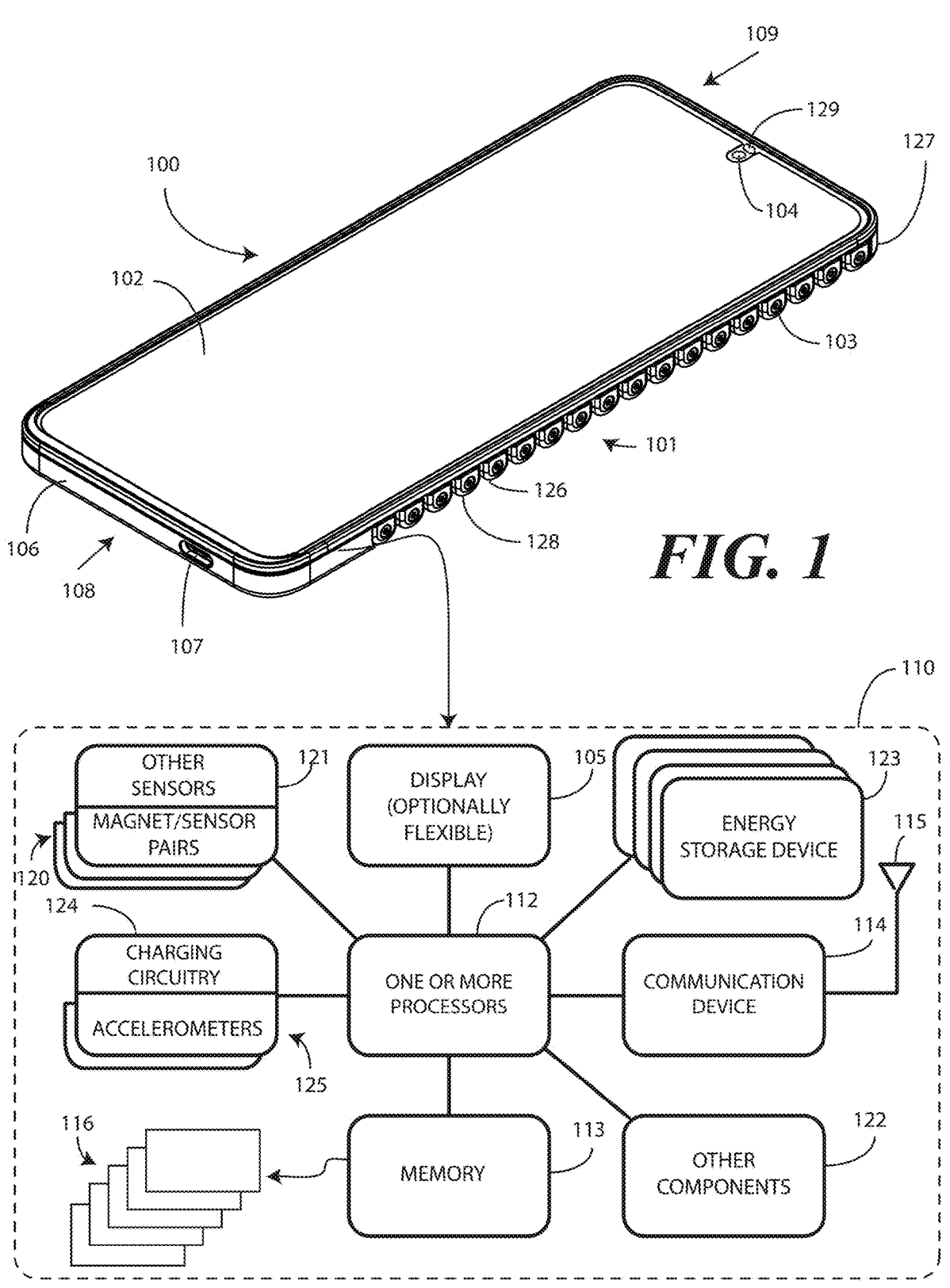
FIG. 1 illustrates one explanatory deformable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting, with one or more sensors, a wrapped geometric form factor defined by a flexible display supported by a deformable housing, initiating, by one or more processors using an image capture device, a video capture operation, determining, with one or more other sensors, an orientation of the wrapped geometric form factor relative to a direction of gravity, and adjusting an orientation of output of the video capture operation to compensate for deviations between the orientation of the wrapped geometric form factor and the direction of gravity. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of, in response to initiation of an video capture operation, rotating output of the video capture operation by an amount that a wrapped, wrist-worn geometric configuration of an electronic device is tilted relative to the direction of gravity to compensate for the amount the wrapped, wrist-worn geometric configuration is tilted relative to the direction of gravity as described herein. The non-processor circuits may include, but are not limited to, a radio receiver, a radio transmitter, signal drivers, clock circuits, power source circuits, and user input devices. As such, these functions may be interpreted as steps of a method to perform detecting, with at least a first sensor, a deformable housing of an electronic device being transitioned to a wrapped geometry about a wrist, detecting, with an image capture device, initiation of a video capture operation while the wrapped geometry has a central axis oriented non-orthogonally relative to a horizon situated within a field of view of the image capture device, and, in response to the initiation of the video capture operation while the central axis is oriented non-orthogonally relative to the horizon, rotating the output of the video capture operation to cause the horizon, when depicted in the output of the video capture operation, to be oriented parallel to a boundary of a cropping mask applied to the output of the video capture operation.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

The advent of adaptive display devices, and in particular deformable electronic devices, has introduced a new realm of possibilities for wearable technology. However, these innovative deformable electronic devices also bring unique challenges, particularly when used in a wrist-worn mode. One significant issue arises from the fact that the wearable device may not always be ideally positioned for viewing if a fixed display portion is utilized. This problem is exacerbated when the device includes an image capture device that needs to be aimed at a target when a video capture operation is initiated. For instance, if the wrist moves at an angle, the user may not be able to see the intended subject of the video recording.

Given the larger screen size of these adaptive devices, certain areas of the display can still be visible to the user even when the device is rotated at an angle that typically occludes a fixed viewing area. This creates a desire to keep the viewing portion of the display flexible, allowing it to adjust based on the device's movement on the user's wrist. Capturing video content while the device is worn on the wrist presents additional ergonomic challenges. Specifically, it is difficult to capture horizontally (roll) and vertically (pitch) aligned content, leading to skewed horizons and suboptimal video quality.

To address these issues, embodiments of the disclosure propose a solution that provides horizon correction and other tilt-adjustment systems and techniques. By utilizing inertial measurement units (IMUs) and, optionally, visual scene information, embodiments of the disclosure can dynamically adjust the output of a video capture operation to compensate for deviations between an orientation of the deformable electronic device in three-dimensional space and the direction of gravity or the angle of the horizon.

This results in the output of the video capture operation matching proper orientations of the depicted horizon, thereby ensuring an upright camera experience. This approach not only compensates for the roll detected by the sensors but also maintains, in one or more embodiments, a horizontal cropping window to ensure that the most important information is captured and displayed. Additionally, in some embodiments one or more processors of the deformable electronic device can provide visual feedback to the user, indicating the degree of compensation and allowing for further adjustments if necessary.

In summary, embodiments of the disclosure aim to enhance the user experience by providing a flexible, adaptive display that can dynamically adjust to various form factors and orientations. This ensures that video recording is optimized, even when the device is worn on the wrist, thereby overcoming the ergonomic challenges associated with traditional fixed-display wearable devices.

In one or more embodiments, a method in an electronic device comprises detecting, with one or more sensors, a wrapped geometric form factor defined by a flexible display supported by a deformable housing. In one or more embodiments, the method comprises initiating, by one or more processors using an image capture device, a video capture operation. Following this, the method comprises determining, with one or more other sensors, an orientation of the wrapped geometric form factor relative to a direction of gravity. Finally, the method includes adjusting an orientation of the output of the video capture operation to compensate for deviations between the orientation of the wrapped geometric form factor and the direction of gravity.

Advantageously, embodiments of the disclosure provide solutions to the challenges posed by adaptive wearable display devices, particularly when used in wrist mode. In one or more embodiments, the methods and systems described below provide an implementation of horizon correction algorithms. Embodiments of the disclosure can leverage these algorithms to dynamically adjust the camera preview and video output, ensuring an optimal viewing experience regardless of the device's orientation on the user's wrist.

By utilizing inertial measurement units and visual scene information, one or more processors of a deformable electronic device can determine the roll and pitch angles, allowing the one or more processors to automatically compensate for any deviations from the horizon. This ensures that the video remains upright and properly aligned, even as the user's wrist moves.

Included in one or more embodiments of the solution is the concept of an ergonomic capture mode. When a user initiates a video recording while the device is in wrist mode, the system assumes that the user does not intend to capture tilted compositions. The inertial measurement unit sensors can detect the roll and adjust the horizon to compensate for the detected tilt. Additionally, at the start of the recording session, the device can, in one or more embodiments, use visual scene information to determine the natural orientation of the video capture session, whether it be portrait or landscape. This initial setup helps maintain a horizontal cropping window in one or more embodiments, dynamically adjusting to ensure that the most important information is captured and displayed.

Furthermore, in one or more embodiments the device provides real-time visual feedback to the user, indicating the degree of compensation being applied. This allows the user to understand how the device is adjusting the video output and make any necessary adjustments to their wrist position. For close-up selfies, the system can also adjust the perspective based on the pitch detected by the device, ensuring that the captured video is both flattering and properly aligned. By leveraging these horizon correction algorithms, embodiments of the disclosure ensure a seamless and ergonomic video recording experience, even in the unique form factor of a wrist-worn adaptive display device.

In summary, the solution enhances the user experience by providing a flexible, adaptive display that can dynamically adjust to various form factors and orientations. This ensures that video recording is optimized, even when the device is worn on the wrist, thereby overcoming the ergonomic challenges associated with traditional fixed-display wearable devices. The use of horizon correction algorithms, IMU sensors, and visual scene information allows the device to maintain an upright and properly aligned video output, providing users with a superior video recording experience.

In one or more embodiments, an electronic device comprises a deformable housing that comprises a plurality of linkage members, a flexible display, and an image capture device supported by the deformable housing. Additionally, the device is equipped with one or more sensors operable to determine a wrapped, wrist-worn geometric configuration of the electronic device. In one or more embodiments, the electronic device also includes one or more other sensors operable to detect when the wrapped, wrist-worn geometric configuration is tilted relative to a direction of gravity. Furthermore, in one or more embodiments the device features one or more processors that work in conjunction with the sensors, the other sensors, and the image capture device. These processors are operable to, in response to the initiation of a video capture operation, rotate the output of the video capture operation by an amount that the wrapped, wrist-worn geometric configuration is tilted relative to the direction of gravity, thereby compensating for the tilt.

In one embodiment of the electronic device, the deformable housing may be constructed from a series of interconnected metal linkage members, providing a robust and durable structure that can withstand the rigors of daily wear on a user's wrist. The flexible display in this embodiment could be an organic light emitting diode screen known for its thinness and flexibility, allowing it to conform smoothly to the curvature of the wrist. The image capture device, possibly a high-resolution camera, can be discreetly integrated into the housing to maintain the sleek design of the device while offering powerful video capturing capabilities.

Another embodiment might feature a deformable housing composed of a lightweight polymer material with flexible joints, offering a comfortable fit and a more cost-effective alternative to metal. The flexible display in this version could be a flexible liquid crystal display panel, which provides a balance between flexibility and display quality. The image capture device in this embodiment could be optimized for low-light performance, ensuring high-quality video capture in various lighting conditions.

A further embodiment could include a modular design where the linkage members of the deformable housing are replaceable or customizable, allowing users to personalize the look and feel of their device. The flexible display might incorporate a next-generation flexible display technology, such as micro-LED, which offers improved brightness and energy efficiency. The image capture device could include advanced features such as optical image stabilization and multiple lenses for different focal lengths, enhancing the video capturing experience.

In yet another embodiment, the electronic device's deformable housing could be designed with an emphasis on water resistance, making it suitable for users with active lifestyles or for use in inclement weather conditions. The flexible display could be coated with a hydrophobic layer to repel water, and the image capture device could be sealed within the housing to prevent moisture ingress.

Each embodiment, while varying in materials, design, and additional features, maintains the core functionality of detecting a wrapped, wrist-worn geometric configuration, determining the orientation relative to gravity, and adjusting the video capture output, accordingly, as outlined in the patent claim. These embodiments demonstrate the invention's adaptability and potential for customization within the legal and functional scope defined by the disclosure.

In one or more embodiments, a method in an electronic device comprises detecting, with at least a first sensor, a deformable device housing of the electronic device being transitioned to a wrapped geometry about a wrist. Next, the method involves detecting, with an image capture device, the initiation of a video capture operation while the wrapped geometry has a central axis oriented non-orthogonally relative to a horizon situated within a field of view of the image capture device. Finally, in response to the initiation of the video capture operation while the central axis is oriented non-orthogonally relative to the horizon, the method includes rotating the output of the video capture operation to cause the horizon, when depicted in the output of the video capture operation, to be oriented parallel to a boundary of a cropping mask applied to the output of the video capture operation.

In one embodiment of the electronic device, the first sensor responsible for detecting the transition to a wrapped geometry around the wrist could be a flexible strain gauge that conforms to the curvature of the wrist, providing accurate readings of the device's positioning. The image capture device, possibly a compact camera module with a wide-angle lens, is optimized for capturing a broad field of view, ensuring that the horizon is within the captured scene even when the device is worn at various angles. The rotation of the video capture output can be managed by a dedicated graphics processing unit that interprets the sensor data and applies real-time adjustments to the video feed, maintaining the horizon parallel to the cropping mask boundary.

In another embodiment, the electronic device features a multi-sensor array that includes gyroscopes and accelerometers, offering enhanced precision in detecting the orientation of the wrapped geometry relative to the horizon. The image capture device in this variant could include advanced stabilization features that work in tandem with the rotation adjustments, providing exceptionally smooth video output. The device's software could also incorporate machine learning algorithms that predict the user's movements and preemptively adjust the video orientation for a seamless viewing experience.

A further embodiment might integrate an environmental sensor suite that not only detects the device's orientation but also assesses ambient light conditions to optimize the video capture settings for the current environment. The image capture device in this configuration could be equipped with HDR capabilities to handle challenging lighting scenarios, ensuring that the horizon is always clearly visible in the video output. The rotation mechanism in this embodiment could be further refined to include user-selectable levels of horizon correction, allowing for personalized video stabilization preferences.

In yet another embodiment, the electronic device can be designed with a modular sensor platform, allowing users to upgrade or replace sensors as newer technologies become available. The image capture device could be a high-resolution camera with interchangeable lenses, catering to various filming requirements. The rotation of the video output could be facilitated by an advanced motion processing chipset that not only adjusts for horizon alignment but also compensates for lens-specific distortions, ensuring that the video output remains true to the scene being captured.

Each embodiment, while varying in sensor technology, image capture capabilities, and processing power, maintains the core functionality of detecting the device's transition to a wrist-worn geometry, initiating video capture, and rotating the output to align the horizon with the cropping mask boundary, as outlined in the patent claim. These embodiments demonstrate an electronic device's adaptability and potential for customization within the legal and functional scope defined by the disclosure.

Advantageously, embodiments of the disclosure provide a unique approach to managing video recording on an adaptive wearable display device, particularly when the device is in a wrist-worn mode. Unlike traditional fixed-display wearable devices, embodiments of the disclosure leverage horizon correction algorithms to dynamically adjust the camera preview and video output based on the device's orientation relative to gravity. By utilizing inertial measurement units and visual scene information, the device can automatically compensate for roll and pitch deviations, ensuring that the video remains upright and properly aligned even as the user's wrist moves.

This ergonomic capture mode, which assumes that the user does not intend to capture tilted compositions, is a novel feature that enhances the user experience. The system's ability to provide real-time visual feedback, indicating the degree of compensation and allowing for further adjustments, further distinguishes it from existing technologies. Additionally, the capability to maintain a horizontal cropping window and dynamically adjust the perspective for close-up selfies adds to its uniqueness. Overall, the combination of these features provides a seamless and ergonomic video recording experience, making embodiments of the disclosure a significant advancement in the field of adaptive wearable display devices.

Moreover, by detecting a wrapped geometric form factor defined by a flexible display supported by a deformable housing, the electronic device can dynamically adapt to various form factors, particularly when worn on the wrist. This adaptability ensures that the device can provide an optimal user experience regardless of its physical configuration.

Initiating a video capture operation using an image capture device while the device is in a wrapped form factor allows the system to leverage its flexible display and deformable housing to capture video content in a manner that is ergonomically suitable for wrist-worn devices. This is particularly useful for maintaining a stable and clear video recording even when the user's wrist is in motion.

Determining the orientation of the wrapped geometric form factor relative to the direction of gravity using sensors enables the device to understand its spatial positioning accurately. This information is crucial for adjusting the video output to ensure that the horizon remains level, thereby preventing skewed or tilted video recordings that can detract from the viewing experience. Other advantages will be described below. Still others will be obvious to those of ordinary skill in the art having the benefit of this disclosure.

Adjusting the orientation of the video capture output to compensate for deviations between the device's orientation and the direction of gravity ensures that the recorded video remains upright and properly aligned. This automatic adjustment enhances the quality of the video by maintaining a consistent horizon, which is particularly important for wearable devices that are subject to frequent movement and changes in orientation.

Turning now to FIG. 1, illustrated therein is one explanatory deformable electronic device 100 configured in accordance with one or more embodiments of the disclosure. The deformable electronic device 100 of FIG. 1 is a portable electronic device. In one or more embodiments, the deformable electronic device 100 includes a deformable link assembly 101 comprising a plurality of linkage members. In one or more embodiments, each linkage member includes a corresponding pivot member 103 that allow the deformable electronic device 100 to be selectively deformed by bending or folding. Advantageously, this allows the deformable electronic device 100 to function as an equivalent to multiple devices depending upon the amount of deformation of the deformable link assembly 101.

For example, the deformable electronic device 100 is shown in an undeformed configuration in which the deformable electronic device 100 is generally flat and substantially planar in FIG. 1. In such a configuration, the deformable electronic device 100 can function as a smartphone, palmtop computer, or tablet computer. However, as will be shown below with reference to FIG. 3, in another embodiment the deformable electronic device 100 can be folded into a tent geometric configuration, in a pad orientation, and can accordingly function as a table clock, content viewer, or auxiliary display when such a condition. It should be obvious to those of ordinary skill in the art having the benefit of this disclosure that the deformable electronic device 100 can function as other devices as a function of its physical geometry, including as a gaming device, a media player, or other device.

This illustrative deformable electronic device 100 includes a display 102, which may optionally be touch-sensitive. In one embodiment where the display 102 is touch-sensitive, the display 102 can serve as a primary user interface of the deformable electronic device 100. Users can deliver user input to the display 102 of such an embodiment by delivering touch input from a finger, stylus, or other objects disposed proximately with the display.

In one embodiment, the display 102 is configured as an organic light emitting diode (OLED) display fabricated on a flexible plastic substrate. However, it should be noted that other types of displays would be obvious to those of ordinary skill in the art having the benefit of this disclosure.

In one or more embodiments, an OLED is constructed on flexible plastic substrates can allow the display 102 to become a flexible display 105 in one or more embodiments with various bending radii. For example, some embodiments allow bending radii of between thirty and six hundred millimeters to provide a bendable display. Other substrates allow bending radii of around five millimeters to provide a display that is foldable through active bending. Other flexible displays 105 can be configured to accommodate both bends and folds. In one or more embodiments the flexible display 105 may be formed from multiple layers of flexible material such as flexible sheets of polymer or other materials.

The explanatory deformable electronic device 100 of FIG. 1 also includes a deformable link assembly 101 comprised of a plurality of linkage members. In one or more embodiments, each linkage member includes one or more pivot members 103. Explanatory operation of one or more embodiments of the deformable link assembly 101 is described in commonly assigned U.S. patent application Ser. No. 18/213,679, filed Jun. 23, 2023, entitled "Deformable Electronic Devices and Methods for Constructing the Same," which is incorporated by reference herein for all purposes.

The pivot members 103, which each include a pivot shaft having its central axis aligned substantially parallel with the surface defined by the display 102, and which each engage a plurality of links that are interleaved in an overlapping arrangement, allow portions of the deformable link assembly 101 to pivot about each linkage member so that the deformable electronic device 100 becomes bendable and/or foldable.

In one or more embodiments, a flexible substrate is situated beneath the display 102. In one or more embodiments, the flexible substrate provides intermediary support structure between the display 102 and the deformable link assembly 101.

In the illustrative embodiment of FIG. 1, the display 102 abuts a major surface of the flexible substrate on an opposite side of the flexible substrate relative to the deformable link assembly 101. In one embodiment, the lower surface of the display 102, or another layer in the mechanical stack-up of the display 102, can be adhered to the flexible substrate on one side of the flexible substrate while the deformable link assembly 101, or alternatively to portions of the deformable link assembly 101, are adhered to the other side of the flexible substrate. In this illustrative embodiment, the display 102 also spans the pivot members 103 of each linkage member. In this illustrative embodiment, the display 102 is flexible so as to deform when the deformable link assembly 101 bends around the pivot members 103.

Features can be incorporated into the deformable electronic device 100. Examples of such features include an optional image capture device 104 or an optional speaker port 129. A user interface component, which may be a button or touch sensitive surface, can also be disposed along a side of an electronic circuit component housing 106. The deformable electronic device 100 can also include one or more connectors 107, which can be an analog connector, a digital connector, or combinations thereof.

A block diagram schematic 110 of the deformable electronic device 100 is also shown in FIG. 1. The block diagram schematic 110 can be configured as a printed circuit board assembly disposed within the electronic circuit component housing 106. Various components can be electrically coupled together by conductors, or a bus disposed along one or more printed circuit boards. A flexible substrate can then span the pivot members 103 to electrically couple electronic circuits situated in the electronic circuit component housing 106 to other components situated within another electronic circuit component housing 127, wherein included, together.

In one or more embodiments, the deformable electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the deformable electronic device 100. Each of the application processor and the auxiliary processor(s) can be configured to process and execute executable software code to perform the various functions of the deformable electronic device 100. A storage device, such as memory 113, can optionally store the executable software code used by the one or more processors 112 during operation.

In this illustrative embodiment, the deformable electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the deformable electronic device 100. For example, in one embodiment the one or more processors 112 comprise one or more circuits operable with one or more user interface devices, which can include the display 102, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the deformable electronic device 100. The operating system environment can include a kernel and one or more drivers, and an application service layer, and an application layer. The operating system environment can be configured as executable code operating on one or more processors or control circuits of the deformable electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the deformable electronic device 100 optionally includes one or more magnet magnetometer pairs 120, operable with the one or more processors 112, to detect a bending operation that causes the deformable link assembly 101 to deform, thereby transforming the deformable electronic device 100 into a deformed geometry, such as that shown in FIGS. 2-7. In one or more embodiments, each magnet magnetometer pair 120 is situated in a linkage member of the plurality of linkage members defining the deformable link assembly 101 such that the magnetometer of each magnet magnetometer pair 120 is situated in a linkage member of the plurality of linkage members and at least one corresponding magnet is situated in another linkage member of the plurality of linkage members that is adjacent to the linkage member in which the magnetometer is situated.

Illustrating by example, if a magnet of one magnet magnetometer pair 120 is situated in linkage member 126, at least one corresponding magnet may be situated in linkage member 128, which is adjacent to linkage member 126. This adjacent positioning of the magnetometer and corresponding magnet of each magnet magnetometer pair 120 allows the one or more processors 112 to identify a deformed geometric configuration of the deformable electronic device 100 from signals received from the magnetometers of the magnet magnetometer pairs 120.

In the illustrative embodiment of FIG. 1, the magnet magnetometer pairs 120 comprise at least three magnet magnetometer pairs. Moreover, in one or more embodiments each magnet magnetometer pair is separated from each other magnet magnetometer pair by at least one linkage member of the plurality of linkage members defining the deformable link assembly 101.

However, more magnet magnetometer pairs 120 can be added as well. For instance, in other embodiments, every linkage member of the deformable link assembly 101 can include either a magnet or a magnetometer of a magnet magnetometer pair 120. Thus, it should be understood that embodiments of the disclosure can have as few as one magnet magnetometer pair 120 or as many as the number of linkage members.

In the illustrative embodiment of FIG. 1, the plurality of linkage members defining the deformable link assembly 101 comprises at least fifteen linkage members. Like the number of magnet magnetometer pairs 120, this number can vary as well. Increasing the number of linkage members allows for tighter bending radii, while decreasing the number of linkage members simplifies the design and reduces the part count necessary to construct the deformable electronic device 100.

age members simplifies the design and reduces the part count necessary to construct the deformable electronic device 100.

In one or more embodiments at least some of the linkage members of the plurality of linkage members defining the deformable link assembly 101 house one or more rechargeable electrochemical cells. In the illustrative embodiment of FIG. 1, each linkage member of the plurality of linkage members defining the deformable link assembly 101 houses a rechargeable electrochemical cell pair.

In one or more embodiments, the magnetometer of odd instances of the linkage members housing the rechargeable electrochemical cell pairs is situated between a first pair of rechargeable electrochemical cells situated within the odd instances of the linkage members housing the rechargeable electrochemical cell pairs. The corresponding magnets of the magnet magnetometer pair 120 of even instances of the linkage members housing the rechargeable electrochemical cell pairs is then situated between a second pair of rechargeable electrochemical cells situated within the even instances of the linkage members housing the rechargeable electrochemical cell pairs.

This "between the cells" positioning of the magnet or magnetometer of each magnet magnetometer pair 120 allows for the determination of a wide range of deformable geometric configurations while using only a small number of magnet magnetometer pairs 120. However, in other embodiments, either the magnetometers or magnets can be situated outside the rechargeable electrochemical cell pairs as well. Other configurations will be obvious to those of ordinary skill in the art having the benefit of this disclosure.

Accelerometers 125 can be used in conjunction with the magnet magnetometer pairs 120. Illustrating by example, a first accelerometer can be positioned in the electronic circuit component housing 106, while a second accelerometer is situated within another electronic circuit component housing 127. In this illustrative embodiment, the electronic circuit component housing 106 is situated to one side of the plurality of linkage members defining the deformable link assembly 101, while the other electronic circuit component housing 127 is situated to another side of the plurality of linkage members defining the deformable link assembly 101.

In one or more embodiments, the one or more processors 112 can use the magnet magnetometer pairs 120 to detect a deformed or undeformed state of the deformable electronic device 100 and can then use the accelerometers 125 to distinguish orientations of those geometric configurations. Illustrating by example, in one or more embodiments the one or more processors 112 are configured to distinguish between the L pad geometric configuration and the L stand geometric configuration, or alternatively between the tent pad geometric configuration and the tent lean back geometric configuration, using signals received from the first accelerometer and the second accelerometer.

In one embodiment, the one or more processors 112 may generate commands or execute control operations based on information received from the various sensors, including the one or more magnet magnetometer pairs 120, the accelerometers 125, the user interface, or the other sensors 121. The one or more processors 112 may also generate commands or execute control operations based upon information received from a combination of the one or more magnet magnetometer pairs 120, the accelerometers 125, the user interface, or the other sensors 121. Alternatively, the one or more processors 112 can generate commands or execute control operations based upon information received from the one or more magnet magnetometer pairs 120 and the accelerometers 125 alone. Moreover, the one or more processors 112 may process the received information alone or in combination with other data, such as the information stored in the memory 113.

In one or more embodiments, the one or more processors 112 are also operable to actuate the image capture device 104 under certain conditions. Illustrating by example, in one or more embodiments the one or more processors 112 can execute a method that actuates the image capture device 104 in the electronic device 100 that causes the image capture device 104 to capture visual content such as images and videos.

In one or more embodiments, the image capture device 104 comprises of one or more cameras with various recording modes, including a video recording mode. In one or more embodiments, the one or more processors 112 control the image capture device 104, thereby instructing it to enter or exit the video recording mode based on specific detected conditions. This actuation capability allows the electronic device 100 to function like a camcorder when it is wrapped around a user's wrist in a specific geometric form factor, and optionally lifted into a camcorder support condition.

In one or more embodiments, one or more sensors 121 are embedded within the electronic device 100 and are configured to detect a variety of conditions and inputs. These sensors may include, but are not limited to, accelerometers, gyroscopes, magnetometers, proximity sensors, and flex sensors, which can include the magnet magnetometer pairs 120.

In one or more embodiments, the one or more sensors 121 can be capable of detecting the wrapped geometric form factor defined by the flexible display 102 supported by a deformable housing, which is indicative of the electronic device 100 being worn on the user's wrist. Additionally, the one or more sensors 121 can be operable to detect gesture input that indicates a camcorder support condition is supporting the electronic device 100 in three-dimensional space while the wrapped geometric form factor is occurring. This detection is then used, in one or more embodiments, to enable the image capture mode of operation of the image capture device 104.

The one or more processors 112, which can serve as the central processing unit(s) of the electronic device 100, execute instructions and coordinating the operations of various components, examples of which can be stored as modules 116 within the memory 113. The one or more processors 112 are operable with the one or more sensors 121 to process the detected conditions, such as the wrapped, wrist-worn geometric configuration and that the image capture device 104 is operating in a video capture operation mode.

The electronic device 100 comprises a deformable housing that includes a plurality of linkage members. The deformable housing provides the structural support necessary for the electronic device 100 to maintain various geometric configurations, including a wrapped, wrist-worn geometric configuration. The plurality of linkage members is interconnected in such a way that they allow the electronic device 100 to be selectively deformed by bending or folding, enabling the electronic device 100 to adapt to different use cases and user preferences.

The flexible display 105 is supported by the deformable housing and is capable of presenting visual content to the user. Due to the flexibility of the display 102, the display 102 can conform to the various shapes dictated by the deformable housing, including when the electronic device 100 is in a wrapped, wrist-worn geometric configuration. The flexible display 105 is part of the user interface, allowing for interaction with the electronic device 100 through touch input or other means.

An image capture device 104 is also supported by the deformable housing and is utilized for capturing visual content such as photos and videos. In one or more embodiments, the image capture device 104 is strategically positioned within the electronic device 100 to function optimally in various geometric configurations, including the wrapped, wrist-worn geometric configuration. The image capture device 104 may include one or more cameras with different recording modes, including a video recording mode.

One or more sensors 121 are operable to determine when the electronic device 100 assumes a wrapped, wrist-worn geometric configuration. These sensors 121 are capable of detecting the physical state of the electronic device 100 and enable or disable certain functionalities based on the device's configuration. The sensors 121 may include, but are not limited to, accelerometers, gyroscopes, magnetometers, and other motion-detecting components.

One or more other sensors are operable to detect when the wrapped, wrist-worn geometric configuration is tilted relative to a direction of gravity. These sensors 121 are used for determining the orientation of the electronic device 100 in space and are used to inform the necessary adjustments to the output of the video capture operation to maintain alignment with the direction of gravity.

One or more processors 112 are operable with the one or more sensors 121, the one or more other sensors, and the image capture device 104. The one or more processors 112 are responsible for managing the overall functionality of the electronic device 100, including the processing of sensor data to determine the geometric configuration and orientation of the electronic device 100. The one or more processors 112 can be programmed to, in response to initiation of a video capture operation, rotate the output of the video capture operation by an amount that the wrapped, wrist-worn geometric configuration is tilted relative to the direction of gravity. This rotation compensates for any deviations between the orientation of the wrapped geometric form factor and the direction of gravity, ensuring that the video capture output remains properly aligned.

In one or more embodiments, the one or more processors 112 further cause the flexible display 105 to present the output of the video capture operation after rotation with a visual indicator indicating that the rotation has occurred. Where presented, the visual indicator provides the user with feedback on the adjustments made to the video output, enhancing the user experience by making the adjustments transparent and understandable.

In one or more embodiments, the visual indicator identifies an amount of the rotation, allowing the user to gauge the degree of adjustment applied to the video output. This feature is particularly useful for users to understand the extent of horizon correction being applied during the video capture operation.

The one or more sensors 121 can comprise at least one inertial motion unit, which may include accelerometers and gyroscopes. These inertial motion units accurately detect the orientation and movement of the electronic device 100, providing the data for the processors to perform horizon correction and other adjustments to the video output.

The one or more processors 112 can be configured to rotate the output of the video capture operation when objects depicted within the output of the video capture operation are misaligned with a border of a cropping mask applied to the output of the video capture operation that has a dimension aligned with the direction of gravity. This feature ensures that the video output maintains a consistent and level horizon, improving the quality of the captured video content.

In one or more embodiments, the electronic device 100 comprises the deformable housing, the flexible display 102, one or more sensors to detect a wrapped geometry, such as those defined by magnet magnetometer pairs 120, one or more other sensors 121, an image capture device 104, and one or more processors 112. In one or more embodiments, the deformable housing includes a plurality of linkage members found in a deformable link assembly 101 and supports the flexible display 102. This deformable link assembly 101 allows the flexible display 102 to maintain a wrapped, wrist-worn geometric configuration, one example of which will be described below with reference to FIG. 8. This configuration is detectable by the one or more sensors defined by magnet magnetometer pairs 120, which are operable to determine when the electronic device 100 assumes the wrapped geometric form factor indicative of being worn on a user's wrist.

The flexible display 102, supported by the deformable housing, is capable of presenting visual content and can be manipulated into various geometric configurations to suit different use cases. The flexible display 102 enables the electronic device 100 to perform video capture operations. The one or more sensors defined by magnet magnetometer pairs 120 work in conjunction with the flexible display 102 to facilitate the detection of the electronic device's geometric configuration.

The one or more sensors 121 may further include a microphone, an earpiece speaker, a second loudspeaker, and a user interface component such as a button or touch-sensitive surface. The one or more sensors 121 may include one or more of an accelerometer, gyroscope, image capture device, and/or display touch sensors to determine whether the deformable electronic device 100 is being held by a first side or a second side in a portrait mode.

The one or more sensors 121 may also include key selection sensors, proximity sensors, a touch pad sensor, a touch screen sensor, a capacitive touch sensor, and one or more switches. Touch sensors may be used to indicate whether any of the user actuation targets present on the display 102 are being actuated. Alternatively, touch sensors disposed in the deformable electronic device 100 can be used to determine whether the deformable electronic device 100 is being touched at side edges or major faces of the deformable link assembly 101. The touch sensors can include surface and/or housing capacitive sensors in one embodiment. The other sensors 121 can also include audio sensors and video sensors (such as a camera).

The one or more sensors 121 can also include motion detectors, such as one or more accelerometers or gyroscopes. For example, an accelerometer may be embedded in the electronic circuitry of the deformable electronic device 100 to show vertical orientation, constant tilt and/or whether the deformable electronic device 100 is stationary. A gyroscope can be used in a similar fashion.

Other components 122 operable with the one or more processors 112 can include output components such as video outputs, audio outputs, and/or mechanical outputs. Examples of output components include audio outputs such as speaker port 129, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, the deformable electronic device 100 comprises a plurality of energy storage devices 123. In one or more embodiments, each energy storage device of the plurality of energy storage devices 123 comprises a rechargeable electrochemical cell. In one or more embodiments, the plurality of energy storage devices 123 include a pair of energy storage devices situated in each linkage member of the plurality of linkage members defining the deformable link assembly 101.

In one or more embodiments, each pair of energy storage devices of the plurality of energy storage devices 123 situates in a corresponding linkage member on a one-to-one basis, with a pair of energy storge devices 123 situated within a corresponding linkage member. In other embodiments, a single energy storage device of the plurality of energy storage devices 123 situates in a corresponding linkage member on a one-to-one basis. In still other embodiments, only some of the linkage members of the plurality of linkage members defining the deformable link assembly 101 will house energy storage devices. Other configurations will be obvious to those of ordinary skill in the art having the benefit of this disclosure.

In the illustrative embodiment of FIG. 1, the plurality of energy storage devices 123 are situated on a rear side of the flexible substrate supporting the display 102. In this example, the plurality of energy storage devices 123 are situated between the electronic circuit component housing 106 to other components situated within another electronic circuit component housing 127. In one or more embodiments, each pair of energy storage devices of the plurality of energy storage devices 123 substantially spans a width of the deformable electronic device.

Each energy storage device of the plurality of energy storage devices 123 can take a variety of forms. In an illustrative embodiment, each energy storage device of the plurality of energy storage devices 123 can comprise an electrochemical cell, which is optionally rechargeable. For instance, the plurality of energy storage devices 123 can each comprise a lithium-ion, lithium-polymer, or other type of rechargeable cell. Other examples of energy storage devices suitable for use with embodiments of the disclosure will be obvious to those of ordinary skill in the art having the benefit of this disclosure. For instance, in other embodiments the plurality of energy storage devices 123 may be a supercapacitor, and so forth.

In one or more embodiments, a first pair of energy storage devices is situated in a first linkage member, with a second pair of energy storages device situated in a second linkage member, and so forth. In one or more embodiments, an electrical conductor couples the energy storage devices of the plurality of energy storage devices 123 together and/or to the one or more processors 112.

Charging circuitry 124 can be included to selectively individual, subsets, or all of the plurality of energy storage devices 123 when depleted. In one or more embodiments, the charging circuitry 124 comprises a charging node that is coupled to each energy storage device of the plurality of energy storage devices 123.

In one or more embodiments, the charging circuitry 124 includes a switch that is electrically coupled between the conductor coupling the plurality of energy storage devices 123. Opening the switch disconnects the conductor from the plurality of energy storage devices 123, while closing the switch couples the plurality of energy storage devices 123 to the components of the block diagram schematic 110.

It is to be understood that FIG. 1 is provided for illustrative purposes only and for illustrating components of one deformable electronic device 100 in accordance with embodiments of the disclosure and is not intended to be a complete schematic diagram of the various components required for an electronic device. Therefore, other deformable electronic devices in accordance with embodiments of the disclosure may include various other components not shown in FIG. 1 or may include a combination of two or more components or a division of a particular component into two or more separate components, and still be within the scope of the present disclosure.

A user can perform a bending operation upon the deformable electronic device 100. For example, a user can apply force at the first end 108 and the second end 109 of the deformable electronic device 100 to pivot linkage members of the deformable link assembly 101 relative to other linkage members of the deformable link assembly 101. This method of deforming the deformable link assembly 101 allows the user to simply and quickly bend the deformable electronic device 100 into a desired geometric configuration. Examples of common geometric configurations include an L geometric configuration, a tent geometric configuration, a hook geometric configuration, and a wrapped geometric configuration. Others will be obvious to those of ordinary skill in the art having the benefit of this disclosure.

In other embodiments, rather than relying upon the manual application of force, the deformable electronic device 100 can include a mechanical actuator to deform the deformable link assembly 101 around the pivot members 103 of each linkage member. For example, a motor or other mechanical actuator can be operable with structural components to deform the deformable link assembly 101 around the pivot members 103 of the linkage members to predetermined angles or geometric alignments in one or more embodiments. The inclusion of a mechanical actuator allows a precise bend angle to be repeatedly achieved without the user having to make adjustments in attempting to achieve the same. However, as the inclusion of a mechanical actuator can increase cost, in other embodiments this component will be omitted.

It should be noted that in one or more embodiments, the display 102 has a compliance coefficient that can be used advantageously to help counter the bending operation. Illustrating by example, when the bending operation transforms the deformable electronic device 100 to a bent configuration, one example of which is shown below with reference to FIG. 3, in one or more embodiments the mechanical layers of the display 102 are loaded by the bending operation and work to bias portions of the deformable link assembly 101 back to the open position of FIG. 1.

Moreover, in one or more embodiments a thin stainless-steel plate (approximately 0.04 millimeters in thickness) forms one layer of the display 102 and will increase the loading. This mechanical loading of the layers of the display 102 can be used to help the user transform the deformable electronic device 100 from folded or partially folded configurations to unfolded configurations in one or more embodiments. The modulus of the display 102 can range from 40-300 giga-Pascals in one or more embodiments.

Regardless of whether the bending operation is a manual one or is instead one performed by a mechanical actuator, it results in the display 102 being deformed by one or more bends about the linkage members. Turning now to FIGS. 2-7, illustrated therein are three illustrative results of bending operations.

Figures 2, 3, 4:
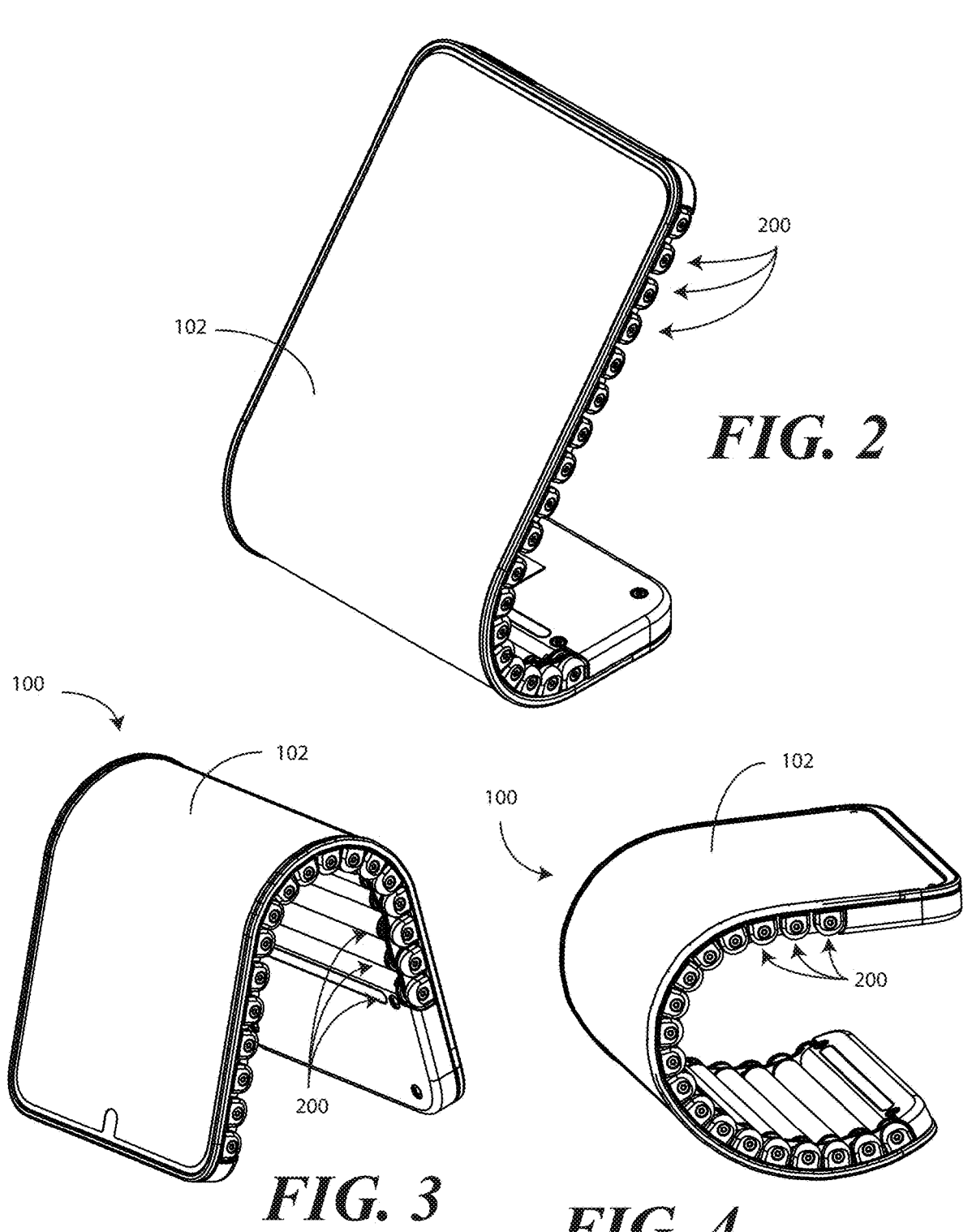
FIG. 2 illustrates one explanatory deformable electronic device in accordance with one or more embodiments of the disclosure when in a deformed to a "L stand" geometric configuration.
FIG. 3 illustrates one explanatory deformable electronic device in accordance with one or more embodiments of the disclosure when in a deformed to a "tent pad" geometric configuration.
FIG. 4 illustrates one explanatory deformable electronic device in accordance with one or more embodiments of the disclosure when in a deformed to a "wrap" geometric configuration.

In the illustrative embodiment of FIG. 2, the deformable electronic device 100 has been deformed into an L-shape geometric configuration. Additionally, the L-shape geometric configuration has been placed on a table or other flat surface such that the minor planar surface of display 102 defining the "L" abuts the surface. This is known as a "L stand" geometric configuration, with the deformable electronic device 100 having a single bend. This bent configuration can make the display 102 easier for the user to view since they do not have to hold the deformable electronic device 100 in their hands.

In this illustrative embodiment, the display 102 has a single bend about the linkage members 200. However, in other embodiments, the display 102 can be deformed with a plurality of bends about the linkage members 200. Other configurations will be obvious to those of ordinary skill in the art having the benefit of this disclosure.

In one embodiment, the one or more processors (112) of the deformable electronic device 100 are operable to detect that a bending operation is occurring from signals from the magnetometers of the magnet magnetometer pairs (120). Said differently, in one or more embodiments the one or more processors (112) are configured to determine whether the deformable electronic device 100 is deformed, and into what geometric configuration, from signals from the magnetometers of the magnet magnetometer pairs (120). This can be done in conjunction with other signals from the accelerometers (125).

Figures 5, 6, 7:
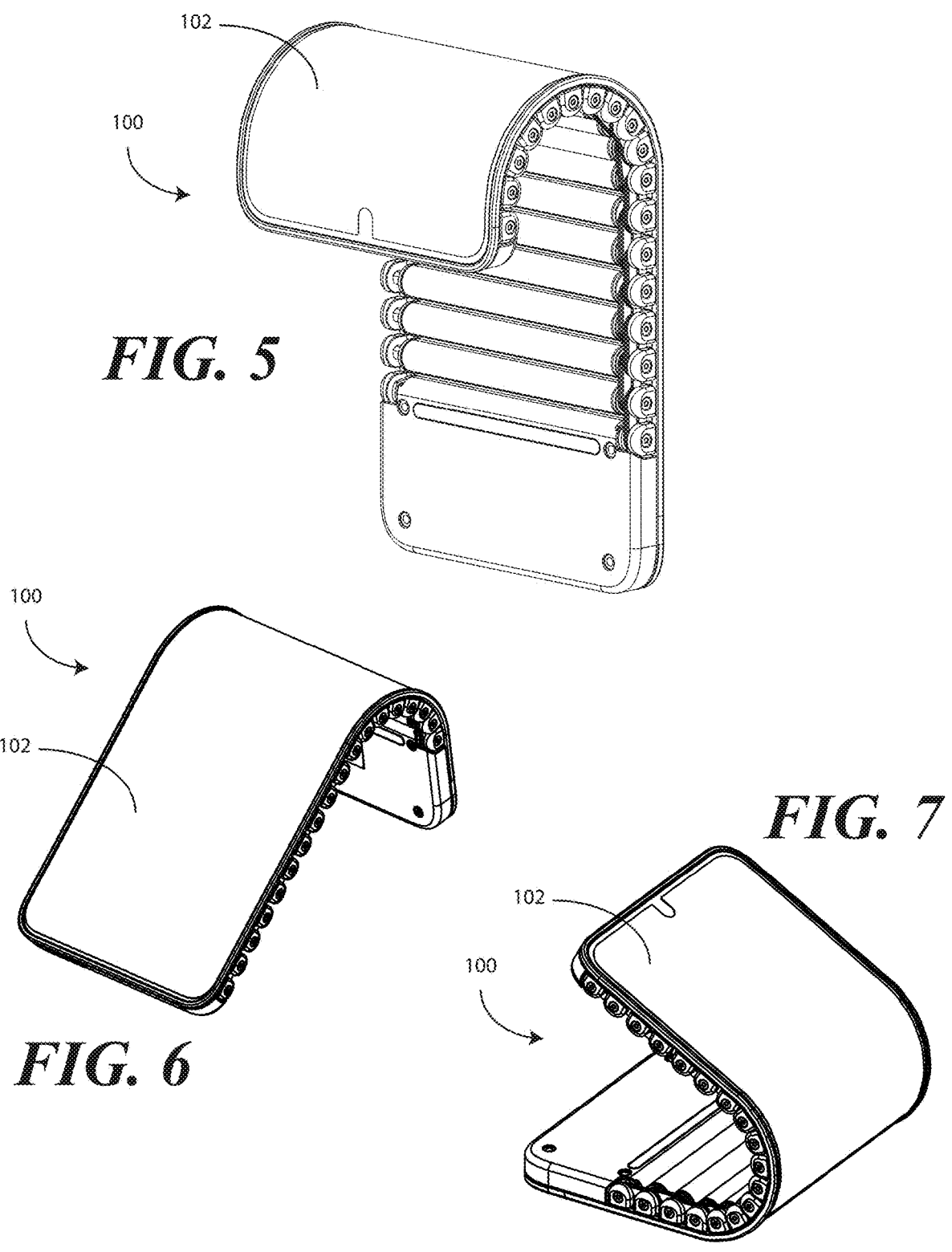
FIG. 5 illustrates one explanatory deformable electronic device in accordance with one or more embodiments of the disclosure when in a deformed to a "hook" geometric configuration.
FIG. 6 illustrates one explanatory deformable electronic device in accordance with one or more embodiments of the disclosure when in a deformed to a "L pad" geometric configuration.
FIG. 7 illustrates one explanatory deformable electronic device in accordance with one or more embodiments of the disclosure when in a deformed to a "tent lean back" geometric configuration.

Where, for instance, the deformable electronic device 100 comprises a first accelerometer situated to one side of the plurality of linkage members and a second accelerometer situated to a second side of the plurality of linkage members, the one or more processors (112) are configured to determine, when the deformable electronic device 100 is deformed as shown in FIG. 2, whether the deformable electronic device 100 is in a pad orientation (the deformable electronic device 100 is shown in a L pad geometric configuration in FIG. 6), a stand orientation, or, in the case of tent folds such as that shown in FIG. 3, whether the deformable electronic device 100 is in a tent pad orientation (shown in FIG. 3) or a tent lean back orientation (the deformable electronic device 100 is shown in a tent lean back geometric configuration in FIG. 7). Techniques for doing this are further described below with reference to FIG. 18.

In FIG. 2, the one or more processors (112) are operable to determine the deformable electronic device 100 is in a L stand configuration from signals from the magnet magnetometer pair (120) and other signals from the accelerometers (125). The one or more processors (112) can detect other geometric configurations of the deformable electronic device 100 as well, one example of which is the hook geometric configuration shown in FIG. 5.

In one or more embodiments, the one or more processors (112) can partition the display 102 of the deformable electronic device 100 as another function of the geometric alignment of the deformable link assembly (101) resulting from the bending operation. For example, in the illustrative embodiment of FIG. 2 the display 102 has been partitioned into a first portion that is visible and a second portion (facing into the surface upon which the deformable electronic device 100 rests), with each portion being disposed on opposite sides of the stand bend. In one or more embodiments, the one or more processors (112) can detect a bend amount as well using the magnet magnetometer pairs (120) and/or accelerometers (125).

In one or more embodiments, the one or more processors (112) of the electronic device are operable to, when the display 102 is deformed by one or more bends, present a first image on a first portion of the display 102, while presenting a second image on a second portion of the display 102. If, for example, the deformable electronic device 100 were turned such that the first end (108) and the second end (109) were resting on the surface, which is known as a "pad" orientation, and which is shown in FIG. 6, the deformable electronic device 100 would resemble an offset tent with a first portion of the display 102 visible from a first side of the bend and a second portion of the display 102 visible from a second side of the bend.

When the bend is made in the middle, rather than in an offset location such as that shown in FIG. 2, the L geometric configuration transforms to a "tent" geometric configuration. One example of such a tent geometric configuration is shown in FIG. 3. As shown in FIG. 3, the deformable electronic device 100 has been bent further to resemble a playing card bent into a "tent" configuration. The tent configuration of FIG. 3 is in a "pad" orientation because the first end (108) and the second end (109) of the deformable electronic device 100 are resting on a surface. This "tent pad" geometric configuration makes the display 102 easier to see from above.

FIG. 4 illustrates the deformable electronic device 100 when deformed into a "wrapped" geometric configuration. When in the wrapped geometric configuration, the deformable electronic device 100 can even be worn on a wrist. When worn on a wrist, the wrapped geometric configuration becomes a wrist-worn wrapped geometric configuration. Whether the electronic device 100 is positioned on a wrist can be determined with touch sensors situated along the deformable housing.

In one or more embodiments, the wrapped geometric configuration can be configured with different radii to accommodate different size wrists. In one or more embodiments, the deformable electronic device 100 can be deformed into at least six different wrapped geometric configurations, each having a smaller radius than the one before to accommodate smaller and smaller wrists.

In one or more embodiments, the plurality of linkage members 200 define a multi-link hinging mechanism for the deformable electronic device 100. In FIGS. 1-7 the linkage members 200 are all similarly configured with links separating each pivot member (103) from another. The linkage members 200 defining the deformable link assembly 101 are attached to a rear major face of the flexible substrate supporting the display 102.

Figure 8:
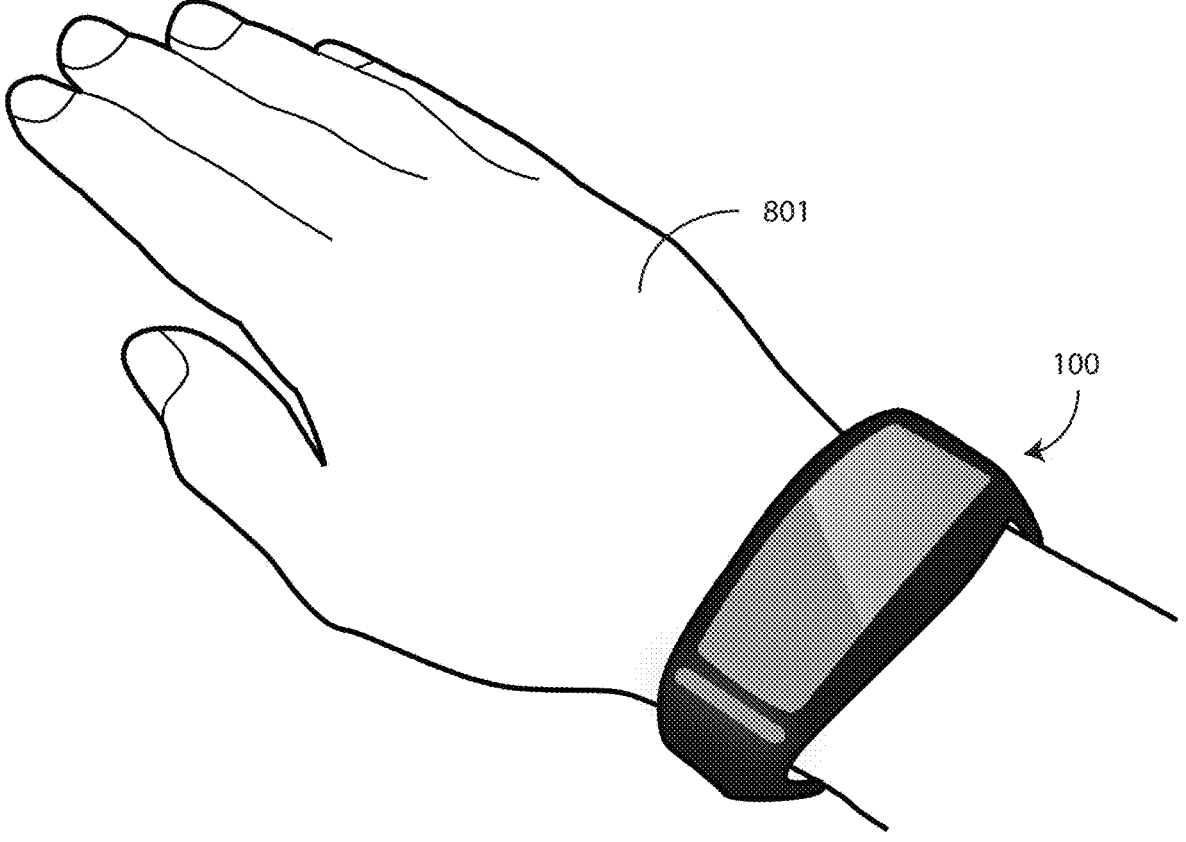
FIG. 8 illustrates one explanatory electronic device in accordance with one or more embodiments of the disclosure in a wrapped geometric form factor while being worn on the wrist of a user.

Turning now to FIG. 8, illustrated therein is a user, identified as user 801, wearing an explanatory electronic device 100 configured in accordance with one or more embodiments of the disclosure on their wrist while in a wrapped geometric form factor. The electronic device 100 is shown in a wrapped geometric configuration, specifically designed to be worn comfortably on the user's wrist. This configuration allows the electronic device 100 to adapt to the shape of the wrist, providing a secure and ergonomic fit.

To detect the wrist-worn wrapped geometric configuration, the electronic device 100 is equipped with one or more sensors. These sensors are strategically placed within the device to capture and analyze data related to the device's position and orientation. By monitoring the data from these sensors, one or more processors (112) of the electronic device 100 can determine if it is being worn on the user's wrist in the intended wrapped configuration.

One way the sensors can detect the wrist-worn wrapped geometric configuration is by utilizing magnet magnetometer pairs (120). These pairs of sensors can measure the magnetic field strength and orientation, allowing the electronic device 100 to detect the specific arrangement of the device's components when wrapped around the wrist. By analyzing the magnetic field data, the electronic device 100 can confirm that it is in the desired wrapped configuration.

Additionally, other sensors (121) integrated into the electronic device 100 can contribute to detecting the wrist-worn wrapped geometric configuration. For example, accelerometers and gyroscopes can sense the device's movement and orientation in three-dimensional space. By analyzing the data from these sensors, the device can determine if it is in the appropriate position and orientation to be considered in the wrapped configuration on the user's wrist.

Overall, the combination of magnet-magnetometer pairs and other sensors allows the electronic device 100 to accurately detect and confirm the wrist-worn wrapped geometric configuration. This ensures that the device enters the desired mode of operation, such as the video recording mode, when it is securely and comfortably worn on the user's wrist.

Figure 9:
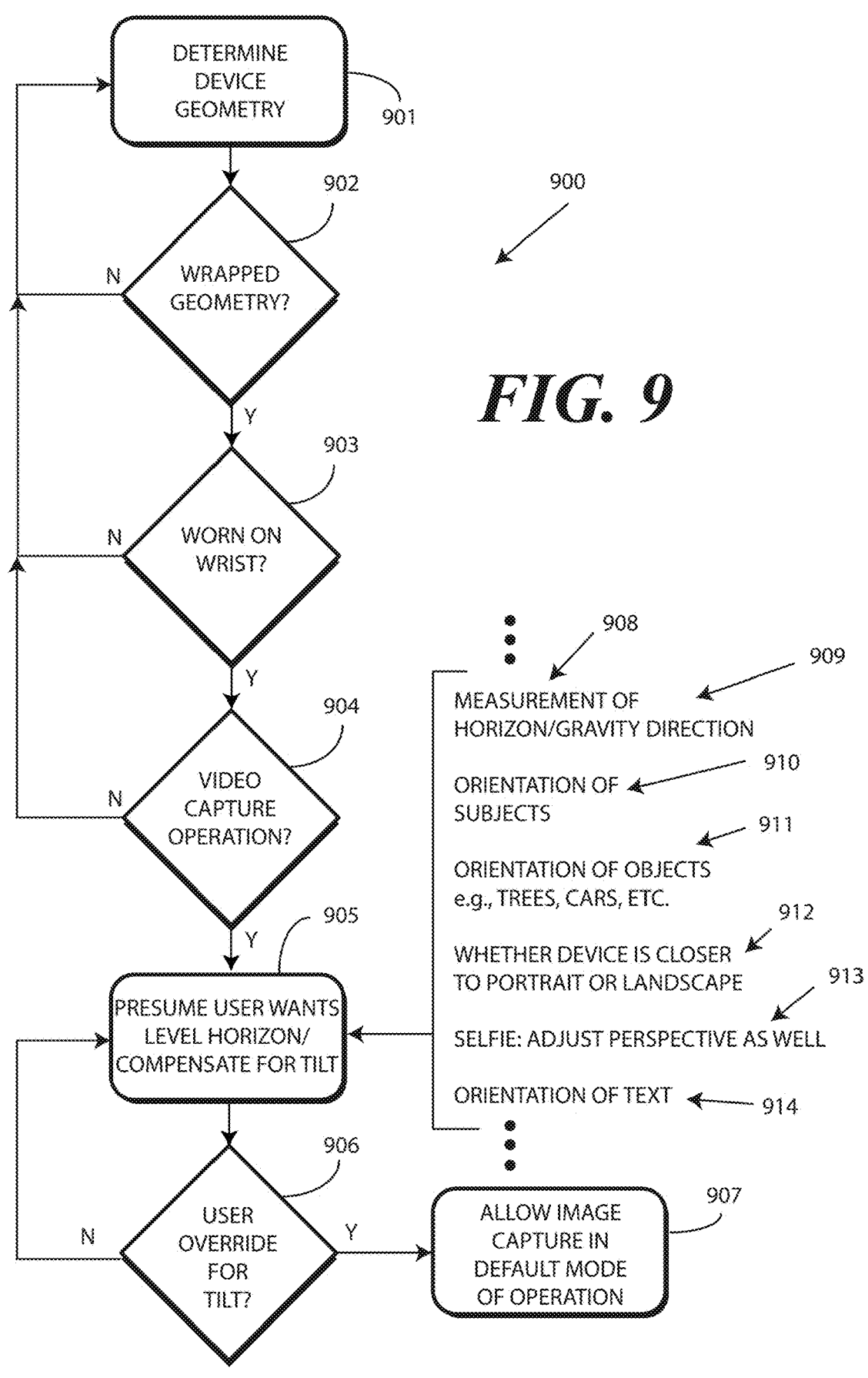
FIG. 9 illustrates one explanatory method in accordance with one or more embodiments of the disclosure.

Embodiments of the disclosure contemplate that users will want to capture images and videos using the electronic device 100 while in the wrist-worn, wrapped geometric form factor. Advantageously, embodiments of the disclosure provide a method for detecting, using one or more processors, a wrapped geometric form factor defined by the flexible display and deformable housing of the electronic device 100. Turning now to FIG. 9, illustrated therein is one explanatory method 900 for adjusting an orientation of output of a video capture operation to compensate for deviations between the orientation of the electronic device 100 while in the wrist-worn, wrapped geometric form factor and the direction of gravity while the video capture operation is occurring.

Before discussing the various steps and decisions of the method 900 of FIG. 9, it should again be noted that electronic devices with adaptive displays, such as those capable of transforming into various form factors like the electronic device (100) of FIGS. 1-8, allow for innovative ways to interact with technology. As described above with reference to FIGS. 2-7, these devices can morph into different configurations, including flat, tent, and wrist-worn modes, to accommodate a range of applications and user preferences.

Embodiments of the disclosure contemplate, however, that then such devices are configured in a wrist-worn mode, they can present challenges. The orientation of the display and the positioning of the camera, in particular, can hinder the user's ability to view content and capture images or videos effectively. The fixed nature of the display portion and the camera's alignment can result in an experience that is less than ideal, especially when the device is worn on the wrist and the user's movement is unrestricted.

Current solutions for wearable devices with fixed displays and cameras are limited in their ability to provide an ergonomic and visually optimal experience. When a user attempts to capture video content with a camera on a wearable device, the resulting footage often suffers from misalignment with the horizon, leading to skewed or tilted images that require post-processing correction. This is due to the fixed orientation of the camera which does not account for the roll and pitch movements of the user's wrist. Additionally, the fixed display may not be visible from the user's viewpoint, especially when the wrist is angled or rotated away from the user's line of sight. These limitations can detract from the user experience and the usability of the device in dynamic environments.

Advantageously, the method 900 of FIG. 9 significantly improves the video recording capabilities of an adaptive wearable display device. In one or more embodiments, when the device is equipped with a flexible display supported by a deformable housing, enabling the device to assume a wrapped, wrist-worn geometric configuration, the method 900 can detect this configuration with one or more sensors and initiate a video capture operation with an image capture device. One or more processors of the device can the determine the orientation of the wrapped geometric form factor relative to the direction of gravity and can adjust the orientation of the video capture output to compensate for any deviations. This "horizon" correction ensures that the captured video content is properly aligned, regardless of the device's orientation on the user's wrist, thereby enhancing the ergonomic capture experience and eliminating the need for post-processing correction.

By detecting a wrapped geometric form factor defined by a flexible display supported by a deformable housing, in one or more embodiments the method 900 of FIG. 9 can dynamically adapt to various form factors, particularly when worn on the wrist. This adaptability ensures that the device can provide an optimal user experience regardless of its physical configuration.

Initiating a video capture operation using an image capture device while the device is in a wrapped form factor allows the system to leverage its flexible display and deformable housing to capture video content in a manner that is ergonomically suitable for wrist-worn devices. This is particularly useful for maintaining a stable and clear video recording even when the user's wrist is in motion.

Determining the orientation of the wrapped geometric form factor relative to the direction of gravity using sensors enables the device to understand its spatial positioning accurately. This information is helpful for adjusting the video output to ensure that the horizon and other objects and persons depicted in the resulting video remain level, thereby preventing skewed or tilted video recordings that can detract from the viewing experience.

Adjusting the orientation of the video capture output to compensate for deviations between the device's orientation and the direction of gravity ensures that the recorded video remains upright and properly aligned. This automatic adjustment enhances the quality of the video by maintaining a consistent horizon, which is particularly important for wearable devices that are subject to frequent movement and changes in orientation.

Beginning at step 901, one or more sensors of the electronic device detect a geometric form factor of an electronic device having a deformable device housing. Decision 902 then determines whether the geometric form factor is deformed to a wrapped geometric form factor. Where it is, decision 903 determines whether the electronic device is worn on a wrist. Decision 904 then determines if a video capture operation is being performed. Where all of these conditions are met, the method 900 moves to step 905. Otherwise, the method 900 returns to step 901 in one or more embodiments.

In one or more embodiments, when decision 902 detects, using one or more sensors, a wrapped geometric form factor defined by a flexible display supported by a deformable housing, and when a user has initiated a video capture operation, step 905 comprises determining, using one or more other sensors, an orientation of the wrapped geometric form factor in three-dimensional space. This can be done in a variety of ways.

In one or more embodiments, at step 905 one or more processors of the electronic device can determine the orientation of the device in three-dimensional space by measuring the direction of gravity 909. This can be achieved through various technical alternatives, each leveraging different types of sensors and methodologies to ensure accurate orientation detection.

One common approach involves the use of inertial measurement units, which typically include accelerometers and gyroscopes. Thus, in one or more embodiments step 905 comprises determining the orientation of the wrapped geometric form factor relative to the direction of gravity by the one or more processors receiving one or more orientation signals from one or more inertial motion units.

Accelerometers can measure the acceleration forces acting on the device, including the constant force of gravity. By analyzing the data from the accelerometers, the processors can determine the tilt and orientation of the device relative to the direction of gravity. Gyroscopes, on the other hand, measure the rate of rotation around the device's axes, providing additional data to refine the orientation calculation. The combination of accelerometer and gyroscope data allows for precise determination of the device's orientation in three-dimensional space.

Another technical alternative for measuring the direction of gravity 909 involves the use of magnetometers. Magnetometers measure the strength and direction of the Earth's magnetic field, which can be used in conjunction with accelerometer data to determine the device's orientation. By comparing the magnetic field data with the known direction of gravity 909, the processors can accurately calculate the device's orientation. This technique is particularly useful in environments where the device may experience rapid movements or changes in orientation, as the magnetometer data can help stabilize and correct the orientation calculations.

In addition to measuring the direction of gravity 909, the processors can also determine the orientation of the electronic device by detecting the orientation of a horizon 908 in captured video images. Thus, in one or more embodiments step 905 comprises determining the orientation of the wrapped geometric form factor relative to the direction of gravity by identifying a horizon depicted in the output of the video capture operation.

This can be achieved through various image processing techniques that analyze the visual content of the video frames. One approach involves edge detection algorithms, which identify the edges and lines within the video frames. By detecting the longest horizontal line in the frame, the processors can determine the orientation of the horizon 908. This information can then be used to adjust the orientation of the video capture output, ensuring that the horizon remains level and properly aligned.

Another method for detecting the orientation of the horizon 908 involves the use of machine learning algorithms. These algorithms can be trained on a large dataset of images with known horizon orientations, allowing them to learn the visual characteristics of a horizon. Once trained, the machine learning model can analyze the video frames in real-time, identifying the horizon and determining its orientation. This approach can be particularly effective in complex scenes where the horizon may be partially obscured or difficult to detect using traditional edge detection methods.

Furthermore, the processors can utilize a combination of sensor data and image analysis to enhance the accuracy of the orientation detection. For example, the accelerometer and gyroscope data can provide an initial estimate of the device's orientation, which can then be refined using the detected horizon orientation from the video frames. This multi-sensor fusion approach leverages the strengths of both sensor-based and image-based methods, resulting in a more robust and accurate determination of the device's orientation in three-dimensional space.

In other embodiments, one or more processors of the electronic device can determine the orientation of the device in three-dimensional space by capturing video images and analyzing the orientation of the subjects 910 depicted within those images. This process can be done in a variety of ways, with each technique leveraging different image processing and computer vision techniques to ensure accurate orientation detection. Thus, in one or more embodiments step 905 comprises determining the orientation of the wrapped geometric form factor relative to the direction of gravity by the one or more processors optically determining an orientation of one or more objects 911 depicted in the output of the video capture operation.

One common approach involves the use of facial recognition algorithms. By identifying and tracking the faces of subjects within the video frames, the processors can determine the orientation of the device based on the relative positioning and alignment of the detected faces. For instance, if the faces appear tilted or skewed, the processors can infer that the device is not level and adjust the orientation accordingly. This technique is particularly useful when capturing selfies 913, as embodiments of the disclosure can make perspective adjustments in addition to leveling adjustments in one or more embodiments.

Another technical alternative involves the use of object detection algorithms. These algorithms can identify and track various objects 911 within the video frames, such as buildings, trees, or other landmarks. By analyzing the orientation of these objects 911, the processors can determine the device's orientation in three-dimensional space. For example, if a building appears to be leaning in the video frame, for example, closer to a portrait orientation than landscape 912, the processors can infer that the device is tilted and make the necessary adjustments to correct the orientation. This technique is particularly useful in outdoor environments where natural landmarks can provide reliable reference points for orientation detection.

Another advanced technique involves the use of machine learning models trained on a large dataset of images with known orientations. These models can learn the visual characteristics of various subjects and their typical orientations, allowing them to analyze the video frames in real-time and determine the device's orientation based on the depicted subjects. For instance, the model can recognize that a person standing upright should appear vertical in the video frame, and any deviation from this expected orientation can be used to infer the device's tilt. This approach can be particularly effective in complex scenes where multiple subjects are present, and traditional methods may struggle to provide accurate orientation detection.

Furthermore, the processors can utilize a combination of these techniques to enhance the accuracy of the orientation detection. For example, facial recognition and object detection algorithms can provide initial estimates of the device's orientation, which can then be refined using horizon detection or machine learning models. Similarly, one or more processors can identify an orientation of text 914 in combination with faces and objects in some embodiments.

This multi-technique fusion approach leverages the strengths of each method, resulting in a more robust and accurate determination of the device's orientation in three-dimensional space. By capturing video images and analyzing the orientation of the subjects depicted within them, the electronic device can dynamically adjust its orientation to ensure optimal video capture and user experience. Other techniques for determining the orientation of the electronic device in three-dimensional space will be obvious to those of ordinary skill in the art having the benefit of this disclosure.

In one or more embodiments, the determination of the orientation of the electronic device in three-dimensional space occurring at step 905 occurs prior to initiation of a video capture operation. As noted above, as described herein it will be clear that functions may be executed out of order from that shown or discussed, including substantially concurrently or in reverse order, depending on the functionality involved. Thus, in one or more embodiments the determination of the orientation of the wrapped geometric form factor relative to the direction of gravity occurs prior to initiation of the video capture operation. Moreover, in one or more embodiments In one or more embodiments, step 905 also comprises adjusting an orientation of output of the video capture operation to compensate for deviations between the orientation of the wrapped geometric form factor and the direction of gravity. In one or more embodiments, the adjusting the orientation of the output of the video capture operation occurring at step 905 occurs only when the wrapped geometric form factor is detected being positioned about the wrist of a wearer.

Where the output of the video capture operation is a "selfie" video, step 905 can comprise adjusting, with the one or more processors, a perspective of the output of the video capture operation when the output of the video capture operation is a selfie. In one or more embodiments, step 905 can optionally comprise applying, by the one or more processors, an adjustment cropping window to the output of the video capture operation such that central portions of the output of the video capture operation remain present on the flexible display as the electronic device changes orientation in three-dimensional space.

Of course, step 905 can comprise presenting the output of the video capture operation on the flexible display after the adjusting the orientation of the output of the video capture operation. Moreover, step 905 can comprise presenting, with the one or more processors on the flexible display, indicia indicating an amount of adjustment applied during the adjusting. An example of this will be illustrated below with reference to FIG. 10.

Embodiments of the disclosure contemplate that a user may want video that has leaning objects or misaligned horizons. All kids of a certain age remember the villain lairs of Adam West's Batman television series having a thirty-degree slant (or so) to emphasize the crookedness of the Joker, Penguin, and Riddler. This show is, of course, a classic American television series that originally aired from 1966 to 1968. Renowned for its campy, lighthearted take on the iconic superhero, the show's often absurd and colorful villains were shown in their hideouts and lairs always at an angle be it the Joker, the Penguin, Catwoman, and the Riddler, each brought to life by a talented cast of guest stars.

Should a modern filmmaker shooting a remake elect to use a wrist worn electronic device to shoot said remake, embodiments of the disclosure contemplate that the user should be able to deliver user input overriding adjustment of the orientation of the output of the video capture operation.

Accordingly, decision 906 determines whether a user interface of the electronic device has received user input overriding adjustment of the orientation of the output of the video capture operation. Where it has, step 907 omits the adjustment of the orientation of the output of the video capture operation to present the output of the video capture operation on the flexible display in a default mode of operation where orientations of the output of the video capture operation align with the orientation of the wrapped geometric form factor. Thus, all that would be missing from our modern filmmaker's recreation of Adam West and sidekick Burt Ward (Batman's loyal sidekick, Robin) taking on the aforementioned villains would be the use of vibrant, comic book-style visuals and onomatopoeic sound effects, such as "Bam!" and "Pow!" during fight scenes appearing at the tilted angles. That and, of course, the archetypical cliffhangers that prompt viewers to tune in for the next installment.

Thus, as illustrated and described the method 900 of FIG. 9 allows for adjusting the orientation of video capture output to ensure proper alignment with the horizon. The method 900 can include detecting a deformable device housing being transitioned to a wrapped geometry around a wrist, detecting the initiation of a video capture operation while the device is in this wrapped geometry, and rotating the video output to align the horizon with a cropping mask boundary. In one or more embodiments, the method includes presenting the adjusted video output on a flexible display and providing indicia indicating the amount of rotation applied.

The method 900 can occurs automatically until user input is received to override it, as detected by decision 906. Once the adjustment is made, the method 900 can present the video output on the flexible display after the rotation, ensuring that the user is aware of the adjustments made to maintain proper horizon alignment.

A few points of note regarding the method 900 of FIG. 9 should be mentioned at this time. It should be noted that the impact of the orientation adjustment provides benefits of specific importance for video recording, particularly in the context of an adaptive wearable display device. The method 900 ensures that the video capture aligns with the user's view and the actual capture, since these may not always align due to the device's movement.

Another point worthy of note is that the use of inertial measurement sensors and visual scene information allow the one or more processors to determine the natural orientation of the capture session and maintain a horizontal cropping window. Additionally, the method 900 of FIG. 9 is preferably directed to video capturing rather than image capturing, as horizon correction is more pertinent to video recording. As will be described below with reference to FIG. 10, in some embodiments in addition to presenting the output of the video capture operation, the flexible display will also show the field of view of the image capture device performing the video capture operation.

Figure 10:
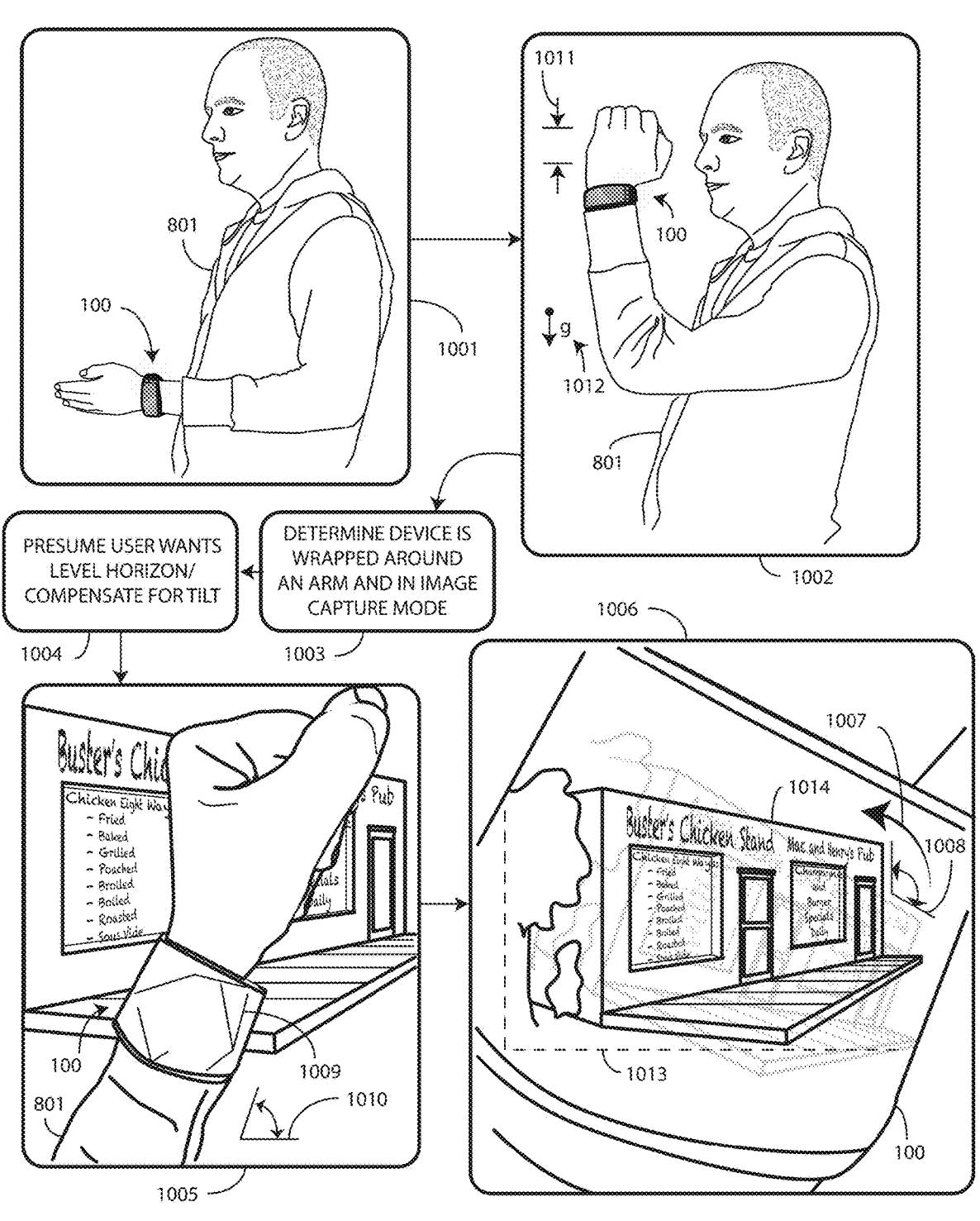
FIG. 10 illustrates one or more explanatory method steps in accordance with one or more embodiments of the disclosure.

Turning now to FIG. 10, illustrated therein is one explanatory method for detecting, with at least a first sensor, a deformable device housing of an electronic device 100 being transitioned into a wrapped geometry about a wrist at step 1003, while an image capture device detects initiation, or continuation, of a video capture operation while the wrapped geometry has a central axis oriented non-orthogonally relative to a horizon situated within a field of view of the image capture device as shown at step 1002. In one or more embodiments, when this occurs, one or more processors of the electronic device 100 rotate the output of the video capture operation at step 1004 to cause the horizon, when depicted in the output of the video capture operation, to be oriented parallel to a boundary of a cropping mask 1013 applied to the output 1014 of the video capture operation.

Embodiments of the disclosure contemplate that when the electronic device 100 is in the wrist-worn, wrapped geometric form factor, a user 801 may like to capture video while their arm is positioned as if they were using an "old-style" camcorder in a grip and can use the image capture device (104) situated on the exterior side of the deformable housing in a camcorder mode of operation. However, embodiments of the disclosure contemplate that the user 801 may not continuously hold their arm vertically or, alternatively, may move their arm in three-dimensional space to change the aspect or to expand the field of view. Embodiments of the disclosure provide a correction for situations where the Batman remake is not being made.

Beginning at step 1001, a user 801 is wearing an electronic device 100 configured in accordance with one or more embodiments of the disclosure. As previously described, the electronic device 100 comprises a deformable housing having a plurality of linkage members, a flexible display supported by the deformable housing, one or more sensors operable to determine the wrist-worn, wrapped geometric form factor of the electronic device 100, and one or more sensors operable to detect an orientation of the electronic device 100 in three-dimensional space when the electronic device 100 is executing a video capture operation. The electronic device 100 also includes an image capture device and one or more processors operable with the one or more sensors, the one or more other sensors, and the image capture device.

At step 1003, the one or more sensors determine that the wrist-worn, wrapped geometric form factor of the electronic device 100 is occurring. At step 1002, the user 801 transitions the electronic device 100 in three-dimensional space toward a camcorder support condition. In one or more embodiments, at least a first sensor detects an orientation of the electronic device 100 relative to the direction of gravity 1012 at step 1002. Illustrating by example, in one or more embodiments inertial measurement units or other devices can determine whether the direction of gravity 1012 passes through a width 1011 of the electronic device 100, or whether there is a deviation between the width 1011 and the direction of gravity 1012. Techniques for doing so were previously described.

At step 1004, one or more processors of the electronic device 100 are operable with the one or more sensors, the one or more other sensors, and the image capture device. At step 1004, the one or more processors are operable to, in response to initiation of the video capture operation, rotate output 1014 of the video capture operation by an amount 1010 the wrapped, wrist-worn geometric configuration is tilted relative to the direction of gravity 1012 to compensate for the amount 1010 the wrapped, wrist-worn geometric configuration is tilted relative to the direction of gravity 1012.

Other operations can be performed at step 1004 as well. Illustrating by example, as shown at step 1006, the one or more processors further cause the flexible display to present the output 1014 of the video capture operation after rotation with a visual indicator 1007 indicating that the rotation has occurred. In one or more embodiments, the visual indicator 1007 also identifies an amount 1008 of the rotation as well. As also shown at step 1006, the one or more processors can apply an adjustment cropping mask 1013 to the output 1014 of the video capture operation such that central portions of the output 1014 of the video capture operation remain present on the flexible display as the electronic device 100 changes orientation in three-dimensional space.

While the image capture device is in a preview mode, as shown at step 1005, the one or more processors can present lead lines 1009 showing the field of view for a given amount

1010 of tilt relative to the direction of gravity 1012. Other indicia suitable for presentation on the flexible display will be obvious to those of ordinary skill in the art having the benefit of this disclosure.

Thus, as shown in FIG. 10, a method for adjusting the orientation of video capture output on an electronic device 100 worn on the wrist of a user 801 includes detecting the device 100 in a wrapped configuration around the user's arm, determining the device's orientation in three-dimensional space, and adjusting the video output to maintain a level horizon. FIG. 10 shows the electronic device 100 in various states: worn on the user's wrist, lifted to initiate image capture in a camcorder-like position, and the resulting video output display with adjusted orientation.

The electronic device 100, when worn on the wrist of the user 801, is detected by sensors to be in a wrapped configuration at step 1003. This state is depicted in steps 1001, 1002, and 1003, where the device 100 is shown in the initial position on the user's wrist and then lifted to a position indicative of initiating a video capture mode. The transition from the initial position to the image capture position involves a rotational movement, which is detected by the device's sensors.

Upon detecting the device 100 in performing the video capture operation, the method proceeds to adjust the orientation of the video output when the electronic device 100 is misaligned with the direction of gravity 1012. This adjustment is necessary to compensate for any amount 1010 of tilt or deviation from the level horizon. Step 1005 illustrates the user's perspective when looking at the electronic device 100, where the video output is initially tilted as indicated by the greyed, skewed view of the Buster's Chicken Shack at step 1006. Step 1006 also shows, in black line, the output 1014 of the video capture operation on the flexible display of the electronic device 100, where the horizon has been corrected to be level with respect to the direction of gravity. As noted above, a cropping mask 1013 can be applied after the correction.

The method illustrated in FIG. 10 ensures that the video capture output remains visually consistent and level, regardless of the orientation of the electronic device 100 during the recording process. This feature enhances the user experience by providing a stable and clear video recording, even when the device is worn on the wrist and the user's arm is in motion.

It should be noted there are several additional advantages offered by embodiments of the disclosure that are not explicitly set forth above. First, the adaptive display and horizon correction features can significantly improve user interaction by providing a more intuitive and seamless experience. Users can effortlessly capture high-quality videos without worrying about the device's orientation, making the technology more accessible to a broader audience, including those who may not be tech-savvy.

Next, the ability to dynamically adjust the display and video output based on the device's orientation allows for a wide range of use cases. For instance, the device can be used effectively in various activities such as sports, outdoor adventures, and professional video recording, where maintaining a stable and level video output is crucial. What's more by utilizing advanced sensors and algorithms to automatically adjust the video output, the device can potentially reduce the need for manual adjustments and post-processing. This can lead to improved battery efficiency, as the device can optimize its power consumption based on real-time data and user interactions.

Embodiments of the disclosure can offer customizable settings that allow users to personalize their video recording experience. For example, in one or more embodiments users can choose the level of horizon correction, apply different cropping masks, or select specific modes for various activities, enhancing the overall user experience. Additionally, the adaptive display and horizon correction features can be integrated with augmented reality applications, providing a more immersive and stable AR experience. This can be particularly beneficial for gaming, navigation, and educational applications, where maintaining a consistent and level view is essential.

Embodiments of the disclosure can be adapted to include accessibility features for users with disabilities. For example, the device can provide haptic feedback or audio cues to indicate the level of horizon correction, making it easier for visually impaired users to capture high-quality videos. Moreover, the modular design and the ability to upgrade sensors and components ensure that the device remains relevant and can adapt to future technological advancements. This "futureproofing" can extend the device's lifespan and provide long-term value to users.

These additional advantages highlight the potential of the disclosed embodiments to offer a more comprehensive and user-friendly experience, making the technology versatile and adaptable to various needs and preferences. Still other advantages will be obvious to those of ordinary skill in the art having the benefit of this disclosure.

Figure 11:
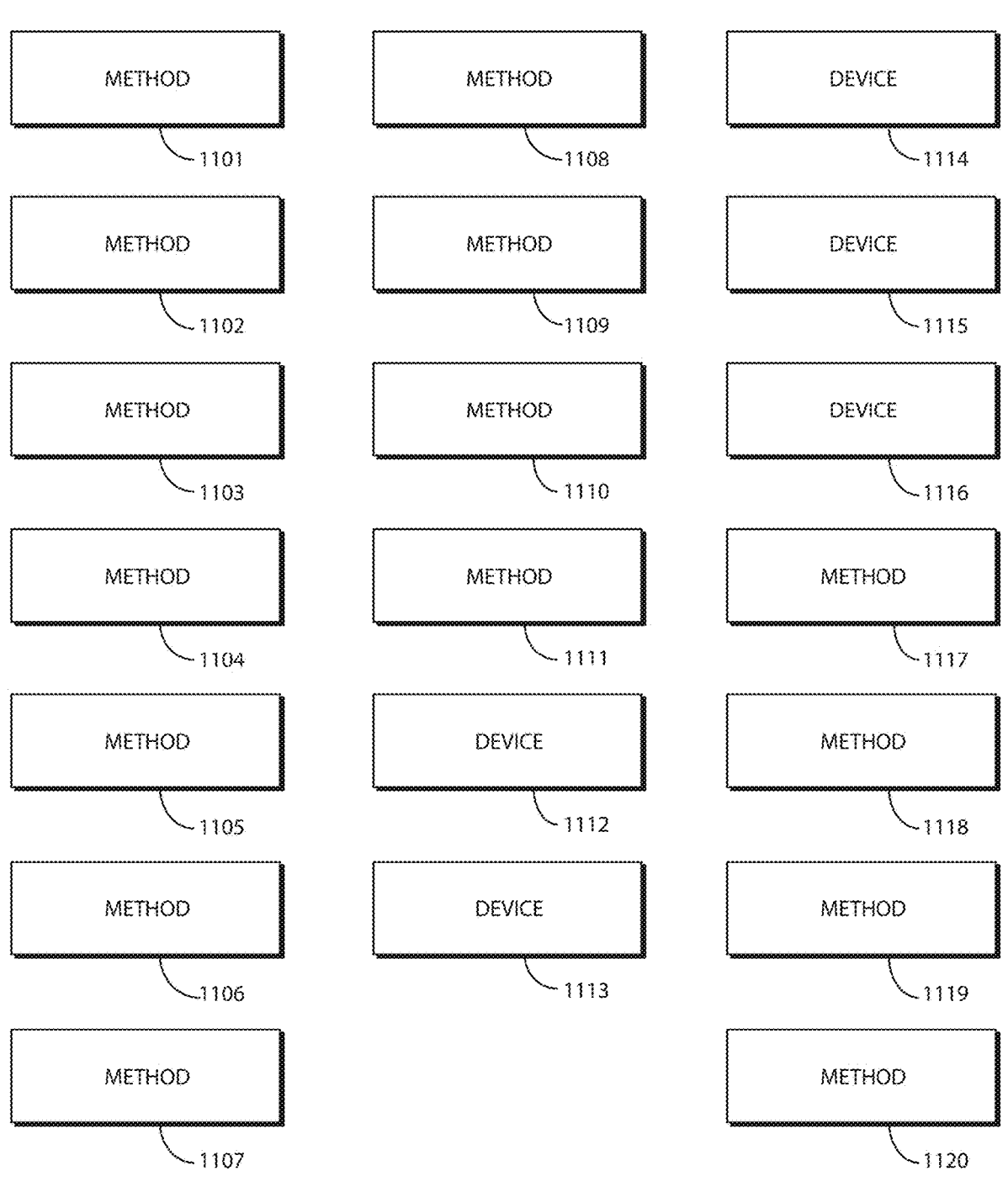
FIG. 11 illustrates various embodiments of the disclosure.

Turning now to FIG. 11, illustrated therein are various embodiments of the disclosure. The embodiments of FIG. 11 are shown as labeled boxes in FIG. 11 due to the fact that the individual components of these embodiments have been illustrated in detail in FIGS. 1-10, which precede FIG. 11. Accordingly, since these items have previously been illustrated and described, their repeated illustration is no longer essential for a proper understanding of these embodiments. Thus, the embodiments are shown as labeled boxes.

At 1101, a method in an electronic device comprises detecting, with one or more sensors, a wrapped geometric form factor defined by a flexible display supported by a deformable housing. At 1101, the method comprises initiating, by one or more processors using an image capture device, a video capture operation.

At 1101, the method comprises determining, with one or more other sensors, an orientation of the wrapped geometric form factor relative to a direction of gravity. At 1101, the method comprises adjusting an orientation of output of the video capture operation to compensate for deviations between the orientation of the wrapped geometric form factor and the direction of gravity.

At 1102, the method of 1101 further comprises receiving, with a user interface of the electronic device, user input overriding adjustment of the orientation of the output of the video capture operation. At 1102, the method comprises, thereafter, omitting the adjusting the orientation of the output of the video capture operation to present the output of the video capture operation on the flexible display in a default mode of operation where orientations of the output of the video capture operation align with the orientation of the wrapped geometric form factor.

At 1103, the method of 1101 further comprises presenting the output of the video capture operation on the flexible display after the adjusting the orientation of the output of the video capture operation. At 1104, the method of 1103 further comprises presenting, with the one or more processors on the flexible display, indicia indicating an amount of adjustment applied during the adjusting. At 1105, the method of 1104 further comprises applying, by the one or more processors, an adjustment cropping window to the output of the video capture operation such that central portions of the output of the video capture operation remain present on the flexible display as the electronic device changes orientation in three-dimensional space.

At 1106, the method of 1101 further comprises also adjusting, with the one or more processors, a perspective of the output of the video capture operation when the output of the video capture operation is a selfie. At 1107, the determining the orientation of the wrapped geometric form factor of 1101 relative to the direction of gravity occurs prior to initiation of the video capture operation.

At 1108, the determining the orientation of the wrapped geometric form factor of 1101 relative to the direction of gravity comprises the one or more processors receiving one or more orientation signals from one or more inertial motion units. At 1108, the determining the orientation of the wrapped geometric form factor of 1101 relative to the direction of gravity comprises the one or more processors optically determining an orientation of one or more objects depicted in the output of the video capture operation.

At 1110, the determining the orientation of the wrapped geometric form factor of 1101 relative to the direction of gravity comprises identifying a horizon depicted in the output of the video capture operation. At 1111, the adjusting the orientation of the output of the video capture operation of 1101 occurs only when the wrapped geometric form factor is detected being positioned about the wrist of a wearer.

At 1112, an electronic device comprises a deformable housing comprises a plurality of linkage members, a flexible display and an image capture device supported by the deformable housing, one or more sensors operable to determine a wrapped, wrist-worn geometric configuration of the electronic device, one or more other sensors operable to detect when the wrapped, wrist-worn geometric configuration is tilted relative to a direction of gravity, and one or more processors operable with the one or more sensors, the one or more other sensors, and the image capture device. At 1112, the one or more processors are operable to, in response to initiation of a video capture operation, rotate output of the video capture operation by an amount the wrapped, wrist-worn geometric configuration is tilted relative to the direction of gravity to compensate for the amount the wrapped, wrist-worn geometric configuration is tilted relative to the direction of gravity.

At 1113, the one or more processors of 1112 further cause the flexible display to present the output of the video capture operation after rotation with a visual indicator indicating that the rotation has occurred. At 1114, the visual indicator of 1113 identifies an amount of the rotation.

At 1115, the one or more other sensors of 1114 comprise at least one inertial motion unit. At 1116, the one or more processors of 1112 rotate the output of the video capture operation when objects depicted within the output of the video capture operation are misaligned with a border of a cropping mask applied to the output of the video capture operation that has a dimension aligned with the direction of gravity.

At 1117, a method in an electronic device comprises detecting, with at least a first sensor, a deformable device housing of the electronic device being transitioned to a wrapped geometry about a wrist. At 1117, the method comprises detecting, with an image capture device, initiation of a video capture operation while the wrapped geometry has a central axis oriented non-orthogonally relative to a horizon situated within a field of view of the image capture device. At 1117, the method comprises, in response to the initiation of the video capture operation while the central axis is oriented non-orthogonally relative to the horizon, rotating the output of the video capture operation to cause the horizon, when depicted in the output of the video capture operation, to be oriented parallel to a boundary of a cropping mask applied to the output of the video capture operation.

At 1118, the method of 1117 further comprises presenting the output of the video capture operation after the rotating on a flexible display supported by the deformable device housing. At 1119, the method of 1118 further comprises presenting indicia on the flexible display indicating both that the output of the video capture operation has been rotated and an amount by which the output of the video capture operation has been rotated. At 1120, the rotating of 1117 occurs automatically until user input is received by the electronic device overriding the rotating.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:

detecting, with one or more sensors, a wrapped geometric form factor defined by a flexible display supported by a deformable housing;

initiating, by one or more processors using an image capture device, a video capture operation;

determining, with one or more other sensors, an orientation of the wrapped geometric form factor relative to a direction of gravity;

adjusting an orientation of output of the video capture operation by rotating the output of the video capture operation by an amount that the wrapped geometric form factor of an electronic device is tilted relative to the direction of gravity to compensate for deviations between the orientation of the wrapped geometric form factor and the direction of gravity.

2. The method of claim 1, further comprising:

receiving, with a user interface of the electronic device, user input overriding adjustment of the orientation of the output of the video capture operation; and thereafter, omitting the adjusting the orientation of the output of the video capture operation to present the output of the video capture operation on the flexible display in a default mode of operation where orientations of the output of the video capture operation align with the orientation of the wrapped geometric form factor.

3. The method of claim 1, further comprising presenting the output of the video capture operation on the flexible display after the adjusting the orientation of the output of the video capture operation.

4. The method of claim 3, further comprising presenting, with the one or more processors on the flexible display, indicia indicating an amount of adjustment applied during the adjusting.

5. The method of claim 4, further comprising applying, by the one or more processors, an adjustment cropping window to the output of the video capture operation such that central portions of the output of the video capture operation remain present on the flexible display as the electronic device changes orientation in three-dimensional space.

6. The method of claim 1, further comprising also adjusting, with the one or more processors, a perspective of the output of the video capture operation when the output of the video capture operation is a selfie.

7. The method of claim 1, wherein the determining the orientation of the wrapped geometric form factor relative to the direction of gravity occurs prior to initiation of the video capture operation.

8. The method of claim 1, wherein the determining the orientation of the wrapped geometric form factor relative to the direction of gravity comprises the one or more processors receiving one or more orientation signals from one or more inertial motion units.

9. The method of claim 1, wherein the determining the orientation of the wrapped geometric form factor relative to the direction of gravity comprises the one or more processors optically determining an orientation of one or more objects depicted in the output of the video capture operation.

10. The method of claim 1, wherein the determining the orientation of the wrapped geometric form factor relative to the direction of gravity comprises identifying a horizon depicted in the output of the video capture operation.

11. The method of claim 1, wherein the adjusting the orientation of the output of the video capture operation occurs only when the wrapped geometric form factor is detected being positioned about the wrist of a wearer.

12. An electronic device, comprising:

a deformable housing comprises a plurality of linkage members;

a flexible display and an image capture device supported by the deformable housing;

one or more sensors operable to determine a wrapped, wrist-worn geometric configuration of the electronic device;

one or more other sensors operable to detect when the wrapped, wrist-worn geometric configuration is tilted relative to a direction of gravity; and one or more processors operable with the one or more sensors, the one or more other sensors, and the image capture device, the one or more processors operable to, in response to initiation of an video capture operation, rotate output of the video capture operation by an amount the wrapped, wrist-worn geometric configuration is tilted relative to the direction of gravity to compensate for the amount the wrapped, wrist-worn geometric configuration is tilted relative to the direction of gravity.

13. The electronic device of claim 12, wherein the one or more processors further cause the flexible display to present the output of the video capture operation after rotation with a visual indicator indicating that the rotation has occurred.

14. The electronic device of claim 13, wherein the visual indicator identifies an amount of the rotation.

15. The electronic device of claim 14, wherein the one or more other sensors comprise at least one inertial motion unit.

16. The electronic device of claim 12, wherein the one or more processors rotate the output of the video capture operation when objects depicted within the output of the video capture operation are misaligned with a border of a cropping mask applied to the output of the video capture operation that has a dimension aligned with the direction of gravity.

17. A method in an electronic device, the method comprising:

detecting, with at least a first sensor, a deformable device housing of the electronic device being transitioned to a wrapped geometry about a wrist;

detecting, with an image capture device, initiation of a video capture operation while the wrapped geometry has a central axis oriented non-orthogonally relative to a horizon situated within a field of view of the image capture device; and in response to the initiation of the video capture operation while the central axis is oriented non-orthogonally relative to the horizon, rotating output of the video capture operation to cause the horizon, when depicted in the output of the video capture operation, to be oriented parallel to a boundary of a cropping mask applied to the output of the video capture operation.

18. The method of claim 17, further comprising presenting the output of the video capture operation after the rotating on a flexible display supported by the deformable device housing.

19. The method of claim 18, further comprising presenting indicia on the flexible display indicating both that the output of the video capture operation has been rotated and an amount by which the output of the video capture operation has been rotated.

20. The method of claim 17, wherein the rotating occurs automatically until user input is received by the electronic device overriding the rotating.

* * * * *